US011372823B2

(12) United States Patent
Dayan et al.

(10) Patent No.: US 11,372,823 B2
(45) Date of Patent: Jun. 28, 2022

(54) FILE MANAGEMENT WITH LOG-STRUCTURED MERGE BUSH

(71) Applicants: Niv Dayan, Somerville, MA (US); Stratos Idreos, Somerville, MA (US)

(72) Inventors: Niv Dayan, Somerville, MA (US); Stratos Idreos, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 251 days.

(21) Appl. No.: 16/773,049

(22) Filed: Jan. 27, 2020

(65) Prior Publication Data

US 2020/0250148 A1    Aug. 6, 2020

Related U.S. Application Data

(60) Provisional application No. 62/801,816, filed on Feb. 6, 2019.

(51) Int. Cl.
| | |
|---|---|
| G06F 17/00 | (2019.01) |
| G06F 7/00 | (2006.01) |
| G06F 16/185 | (2019.01) |
| G06F 7/14 | (2006.01) |
| G06F 16/13 | (2019.01) |

(52) U.S. Cl.
CPC .............. *G06F 16/185* (2019.01); *G06F 7/14* (2013.01); *G06F 16/13* (2019.01)

(58) Field of Classification Search
CPC ........... G06F 16/185; G06F 16/13; G06F 7/14
USPC ........................................................ 707/829
See application file for complete search history.

(56) References Cited

U.S. PATENT DOCUMENTS

| | | | | |
|---|---|---|---|---|
| 5,628,006 A | * | 5/1997 | Fatzinger | G06F 16/2358 714/E11.13 |
| 6,037,945 A | * | 3/2000 | Loveland | G06Q 10/06 700/107 |
| 6,411,951 B1 | * | 6/2002 | Galindo-Legaria | G06F 16/24549 707/999.003 |
| 6,457,159 B1 | * | 9/2002 | Yalcin | G06F 30/33 716/108 |
| 8,682,705 B2 | * | 3/2014 | Bobak | H04L 41/0631 705/7.22 |
| 9,963,106 B1 | * | 5/2018 | Ricci | G05D 1/0287 |
| 11,163,779 B1 | * | 11/2021 | Kulikov | G06F 16/24578 |
| 11,184,766 B1 | * | 11/2021 | Lord | G06K 9/0002 |

(Continued)

OTHER PUBLICATIONS

Dayan et al. "The Log-Structured Merge-Bush & the Wacky Continuum", Jul. 5, 2019, SIGMOD '19 (Year: 2019).*

*Primary Examiner* — Pavan Mamillapalli
(74) *Attorney, Agent, or Firm* — Morgan, Lewis & Bockius LLP

(57) ABSTRACT

Embodiments of the present invention provide a new multi-level data structure, log-structured merge bush (LSM-bush), to alleviate the performance compromise between LSH-table and LSM-tree data structures. Similar to LSM-tree, LSM-bush may buffer writes in memory, merge the writes as sorted runs across multiple levels in storage, and use in-memory fence pointers and Bloom filters to facilitate lookups. LSM-bush differs from LSM-tree in that it allows newer data to be merged more "lazily" than LSM-tree. This can be achieved by allowing larger numbers of runs to be collected at the smaller levels before merging them.

22 Claims, 19 Drawing Sheets

| | Designs Term | Tiered LSM-Tree [55, 23, 43] | Lazy Leveled LSM-Tree [25] | Leveled LSM-Tree [32, 29, 23] | COLA [15, 45] | FD-Tree [57] | B$^\varepsilon$Tree [16, 15, 44, 70, 9, 45] | B+Tree [13] |
|---|---|---|---|---|---|---|---|---|
| Parameters | T (Growth Factor) | [2, B] | [2, B] | [2, B] | 2 | [2, B] | [2, B] | B |
| | K (Hot Merge Threshold) | T - 1 | T - 1 | 1 | 1 | 1 | 1 | 1 |
| | Z (Cold Merge Threshold) | T - 1 | 1 | 1 | 1 | 1 | 1 | 1 |
| | D (Max. Node Size) | $[1, \frac{N}{B}]$ | $[1, \frac{N}{B}]$ | $[1, \frac{N}{B}]$ | $\frac{N}{B}$ | $\frac{N}{B}$ | 1 | 1 |
| | $M_F$ (Fence & Filter Mem.) | $N \cdot (\frac{F}{B} + 10)$ | $N \cdot (\frac{F}{B} + 10)$ | $N \cdot (\frac{F}{B} + 10)$ | $\frac{F \cdot T \cdot M_B}{E \cdot B}$ | $\frac{F \cdot T \cdot M_B}{E \cdot B}$ | $\frac{F \cdot T \cdot M_B}{E \cdot B}$ | $\frac{F \cdot T \cdot M_B}{E \cdot B}$ |
| Metrics | Update | $O(\frac{1}{B})$ | $O(\frac{1}{B} \cdot (T+L))$ | $O(\frac{T}{B} \cdot L)$ | $O(\frac{1}{B})$ | $O(\frac{T}{B} \cdot L)$ | $O(\frac{T}{B} \cdot L)$ | $O(L)$ |
| | Zero Result Lookup | $) \frac{-M_{BF}}{N}$ | $O(e^{\frac{-M_{BF}}{N}})$ | $O(e^{\frac{-M_{BF}}{N}})$ | $O(L)$ | $O(L)$ | $O(L)$ | $O(L)$ |
| | Existing Lookup | $O(1 + T \cdot e^{\frac{-M_{BF}}{N}})$ | $O(1)$ | $O(1)$ | $O(L)$ | $O(L)$ | $O(L)$ | $O(L)$ |
| | Short Scan | $O(L \cdot T)$ | $O(1 + T \cdot (L-1))$ | $O(L)$ | $O(L)$ | $O(L)$ | $O(L)$ | $O(L)$ |
| | Long Scan | $O(T \cdot \frac{S}{B})$ | $O(\frac{S}{B})$ | $O(\frac{S}{B})$ | $O(\frac{S}{B})$ | $O(\frac{S}{B})$ | $O(\frac{S}{B})$ | $O(\frac{S}{B})$ |

(56) References Cited

U.S. PATENT DOCUMENTS

| | | | | |
|---|---|---|---|---|
| 2002/0087373 | A1* | 7/2002 | Dickstein | G06Q 40/00 |
| | | | | 705/35 |
| 2002/0123891 | A1* | 9/2002 | Epstein | G10L 15/197 |
| | | | | 704/235 |
| 2003/0215138 | A1* | 11/2003 | Raghupathy | G06V 30/1423 |
| | | | | 382/186 |
| 2004/0093559 | A1* | 5/2004 | Amaru | G06F 16/26 |
| | | | | 707/E17.058 |
| 2005/0039166 | A1* | 2/2005 | Betts | G06F 40/143 |
| | | | | 717/114 |
| 2011/0276781 | A1* | 11/2011 | Sengupta | G06F 16/137 |
| | | | | 711/216 |
| 2014/0032593 | A1* | 1/2014 | Libenzi | G06F 16/245 |
| | | | | 707/769 |
| 2014/0071271 | A1* | 3/2014 | Altmann | H04N 13/161 |
| | | | | 348/207.1 |
| 2015/0007319 | A1* | 1/2015 | Antonov | G06F 21/56 |
| | | | | 726/23 |
| 2016/0034821 | A1* | 2/2016 | Konoshima | G06N 7/005 |
| | | | | 706/52 |
| 2019/0372772 | A1* | 12/2019 | Novotny | H04L 9/3239 |

* cited by examiner

|  | LSH-TABLE | LSM-TREE |
|---:|:---:|:---:|
| writes | ✓ | ✗ |
| point lookups | ✓ | ✓ |
| range lookups | ✗ | ✓ |
| main memory | ✗ | ✓ |
| examples: | FASTER<br>BitCask, Sparkey<br>HashCache, SkimpyStach<br>BufferHash, FAWN<br>FlashStore | RocksDB<br>BigTable, LevelDB<br>Cassandra, Hbase, Accumulo<br>Voldemort, cLSM, bLSM<br>WiredTiger, Dynamo |

FIG. 1

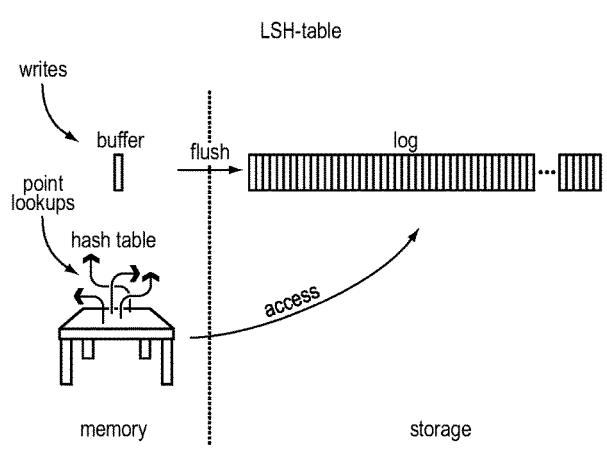
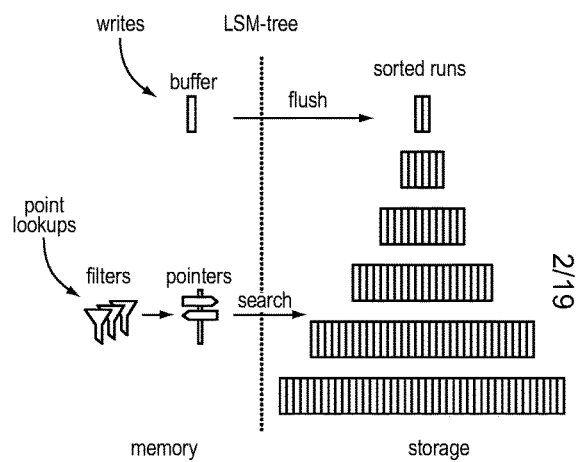
FIG. 2A                    FIG. 2B

| | LSH-table | 3L-bush | LL-bush | LSM-tree |
|---|---|---|---|---|
| write cost (I/O) | $O(1/B)$ | $O(1/B)$ | $O((\log \log N)/B)$ | $O((\log N)/B)$ |
| range lookup cost (I/O) | $O(N)$ | $O(N^{2/3} + s)$ | $O(N^{1/2} + s)$ | $O(N + s)$ |
| point lookup cost (I/O) | $O(1)$ | $O(1)$ | $O(1)$ | $O(1)$ |
| main memory (bits) | $\Omega(N \cdot K \cdot B)$ | $\Omega(N \cdot (K + B \cdot \log(N)))$ | $\Omega(N \cdot (K + B))$ | $\Omega(N \cdot (K + B))$ |

| Term | Definition | unit |
|---|---|---|
| N | data size | blocks |
| B | block size | entries |
| s | range lookup size | blocks |
| K | key size | bits |

FIG. 3

|  | LSH-table | 3L-bush | LSM-bush | LL-bush | LSM-tree |
|---|---|---|---|---|---|
| write cost (I/O) | $O(1/B)$ | $O(1/B)$ | $O(L/B)$ | $O(\log(\log(N))/B)$ | $O(\log(N)/B)$ |
| range lookup cost (I/O) | $O(N)$ | $O(N^{2/3} + s)$ | $O(N^{2^{L/(2L+1)}-4} + s)$ | $O(N^{1/2} + s)$ | $O(\log(N) + s)$ |
| point lookup cost (I/O) | $O(1)$ | $O(1)$ | $O(1)$ | $O(1)$ | $O(1)$ |
| main memory (bits) | $O(N \cdot B \cdot K)$ | $O(N \cdot (B \cdot \log(N) + K))$ | $O(N \cdot ((B \cdot \log(N))/2^L + K))$ | $O(N \cdot (B + K))$ | $O(N \cdot (B + K))$ |

FIG. 6

|  | Term | Name | Description | Min. Value | Max. Value | Units |
|---|---|---|---|---|---|---|
| Environment Parameters | B | Block Size | # data entries that fit in a storage block. |  |  | Entries |
|  | M | Memory | Total main memory budget. | $\frac{B \cdot E + F \cdot T \cdot M_B}{E \cdot B}$ | $N \cdot E$ | Bits |
|  | N | Dataset Size | # data entries in the dataset. |  |  | Entries |
|  | E | Entry Size | Size of an entry |  |  | Bits |
|  | F | Key Size | Size of a key, also used to approximate size of a fence (fence key and pointer). |  |  | Bits |
|  | s | Avg. Selectivity | Average selectivity of a long range query |  |  | Entries |
| Design Parameters | T | Growth Factor | Capacity ratio between adjacent levels. | 2 | B | Ratio |
|  | K | Hot Merge Threshold | Maximum # runs per hot level. | 1 | T-1 | Runs |
|  | Z | Cold Merge Threshold | Maximum # runs per cold level. | 1 | T-1 | Runs |
|  | D | Max. Node Size | Maximum size of a node; defines a contiguous data region. | 1 | $\frac{N}{B}$ | Blocks |
|  | $M_F$ | Fence & Filter Memory Budget | # bits of main memory budgeted to fence pointers and filters. | $\frac{F \cdot T \cdot M_B}{E \cdot B}$ | M | Bits |

FIG. 11

| Derived Term | Expression | Units |
|---|---|---|
| L (# total levels) | $\lceil \log_T \frac{N \cdot E}{M_B} \rceil$ | Levels |
| X (Filters Memory Thresold) | $\frac{1}{\ln 2^2} \cdot (\frac{\ln T}{T-1} + \frac{\ln K - \ln Z}{T})$ | Bits per Entry |
| $M_{F_{XX}}$ ($M_F$ Thresold: Hot Levels Saturation) | $N \cdot (\frac{X}{T} + \frac{F}{B})$ | Bits |
| $M_{F_{XX}}$ ($M_F$ Thresold: Cold Levels Saturation) | $\frac{M_B \cdot F \cdot T}{E \cdot B}$ | Bits |
| Y (# Cold levels) | $\begin{cases} 0 & \text{if } M_F \geq M_{F_{XX}} \\ \lceil \log_T \frac{N}{M_F} \cdot (\frac{X}{T} + \frac{E}{B}) \rceil & \text{if } M_F < M_F < M_{F_{XX}} \\ L - 1 & \text{if } M_F = M_{F_{XX}} \end{cases}$ | Levels |
| $M_{FP}$ (Fence Pointer Memory Budget) | $T^{L-Y+1} \cdot F \cdot \frac{M_B}{E \cdot B} \cdot \frac{T}{T-1}$ | Bits |
| $M_{BF}$ (Filter Memory Budget) | $M_F - M_{FP}$ | Bits |
| $M_B$ (Buffer Memory Budget) | $B \cdot E + (M - M_F)$ | Bits |
| $p_{sum}$ (Sum of BF False Positive Rates) | $e^{-\frac{M_{BF}}{N} \cdot \ln(2)^1} \cdot T^\gamma \cdot Z \frac{T-1}{T} \cdot KX \cdot \frac{T^{\frac{T}{T-1}}}{T-1}$ | |
| $p_i$ (BF False Positive Rate at Level i) | $\begin{cases} 0 & \text{if } i > L - Y \\ \frac{p_{sum}}{Z} \cdot \frac{T-1}{T} & \text{if } i = L - Y \\ \frac{p_{sum}}{K} \cdot \frac{T-1}{T} \cdot \frac{1}{T^{L-Y-1}} & \text{if } i < L - Y \end{cases}$ | Probability |

FIG. 11 (CONTINUED)

| | Term \ Designs | Tiered LSM-Tree [55, 23, 43] | Lazy Leveled LSM-Tree [25] | Leveled LSM-Tree [32, 29, 23] | COLA [15, 45] | FD-Tree [57] | B$^\varepsilon$Tree [16, 15, 44, 70, 9, 45] | B+Tree [13] |
|---|---|---|---|---|---|---|---|---|
| Parameters | T (Growth Factor) | [2, B] | [2, B] | [2, B] | 2 | [2, B] | [2, B] | B |
| | K (Hot Merge Threshold) | T-1 | T-1 | 1 | 1 | 1 | 1 | 1 |
| | Z (Cold Merge Threshold) | T-1 | 1 | 1 | 1 | 1 | 1 | 1 |
| | D (Max. Node Size) | $[1, \frac{N}{B}]$ | $[1, \frac{N}{B}]$ | $[1, \frac{N}{B}]$ | $\frac{N}{B}$ | $\frac{N}{B}$ | 1 | 1 |
| | $M_F$ (Fence & Filter Mem.) | $N \cdot (\frac{F}{B} + 10)$ | $N \cdot (\frac{F}{B} + 10)$ | $N \cdot (\frac{F}{B} + 10)$ | $\frac{F \cdot T \cdot M_B}{E \cdot B}$ | $\frac{F \cdot T \cdot M_B}{E \cdot B}$ | $\frac{F \cdot T \cdot M_B}{E \cdot B}$ | $\frac{F \cdot T \cdot M_B}{E \cdot B}$ |
| Metrics | Update | $O(\frac{L}{B})$ | $O(\frac{1}{B} \cdot (T+L))$ | $O(\frac{T}{B} \cdot L)$ | $O(\frac{L}{B})$ | $O(\frac{T}{B} \cdot L)$ | $O(\frac{T}{B} \cdot L)$ | $O(L)$ |
| | Zero Result Lookup | $O(e^{\frac{-M_{BF}}{N}})$ | $O(e^{\frac{-M_{BF}}{N}})$ | $O(e^{\frac{-M_{BF}}{N}})$ | $O(L)$ | $O(L)$ | $O(L)$ | $O(L)$ |
| | Existing Lookup | $O(1 + T \cdot e^{\frac{-M_{BF}}{N}})$ | $O(1)$ | $O(1)$ | $O(L)$ | $O(L)$ | $O(L)$ | $O(L)$ |
| | Short Scan | $O(L \cdot T)$ | $O(1 + T \cdot (L-1))$ | $O(L)$ | $O(L)$ | $O(L)$ | $O(L)$ | $O(L)$ |
| | Long Scan | $O(T \cdot \frac{S}{B})$ | $O(\frac{S}{B})$ | $O(\frac{S}{B})$ | $O(\frac{S}{B})$ | $O(\frac{S}{B})$ | $O(\frac{S}{B})$ | $O(\frac{S}{B})$ |

FIG. 12

| | Designs / Terms | Log | LSH Table [80, 19, 82, 74, 58, 2, 89] | Sorted Array |
|---|---|---|---|---|
| Parameters | T (Growth Factor) | $\frac{N \cdot E}{M_b}$ | $\frac{N \cdot E}{M_b}$ | $\frac{N \cdot E}{M_b}$ |
| | K (Hot Merge Threshold) | T - 1 | T - 1 | 1 |
| | Z (Cold Merge Threshold) | T - 1 | T - 1 | 1 |
| | D (Max. Node Size) | 1 | 1 | $\frac{N}{B}$ |
| | $M_F$ (Fence & Filter Mem.) | $\frac{N \cdot F}{B}$ | $N \cdot F \cdot (1 + \frac{1}{B})$ | $\frac{N \cdot F}{B}$ |
| Metrics | Update | $O(\frac{1}{B})$ | $O(\frac{1}{B})$ | $O(\frac{N \cdot E}{M_b \cdot B})$ |
| | Zero Result Lookup | $O(\frac{N \cdot E}{M_b \cdot B})$ | $O(0)$ | $O(1)$ |
| | Single Result Lookup | $O(\frac{N \cdot E}{M_b \cdot B})$ | $O(1)$ | $O(1)$ |
| | Short Range Scan | $O(\frac{N \cdot E}{M_b \cdot B})$ | $O(\frac{N \cdot E}{M_b \cdot B})$ | $O(1)$ |
| | Long Range Scan | $O(\frac{N \cdot E}{M_b \cdot B} \cdot \frac{s}{B})$ | $O(\frac{N \cdot E}{M_b \cdot B} \cdot \frac{s}{B})$ | $O(\frac{s}{B})$ |

FIG. 15

FILE MANAGEMENT WITH LOG-STRUCTURED MERGE BUSH

CROSS-REFERENCE TO RELATED APPLICATION

This application claims priority to, and the benefit of, U.S. Provisional Patent Application No. 62/801,816, filed on Feb. 6, 2019, the entire disclosure of which is hereby incorporated by reference.

GOVERNMENT FUNDING

The present invention was supported in part by grant no. IIS-1452595 from the National Science Foundation. The U.S. Government has certain rights in the invention.

FIELD OF THE INVENTION

The field of the invention relates, generally, to key-value stores and, more particularly, to the key-value stores involving log-structured file systems.

BACKGROUND

The size of the raw data in many "big data" applications today is larger than the available volatile memory (typically DRAM); most data thus resides in nonvolatile mass storage devices (e.g., hard disk or solid-state drive (SSD)). Because storage devices are orders of magnitude slower than memory devices, accessing storage for input or output (I/O) becomes the primary performance bottleneck. The choice of data structure for persisting data in storage is thus crucial. Different data structures may strike different trade-offs between the I/O costs of application writes, point lookups and range lookups. Maximizing throughput generally requires choosing the data structure that strikes the best trade-off for a given application.

Conventionally, large data stores are often organized as key-value stores (KV-stores) that include databases to map "keys" to their corresponding "values." (A key refers to a unique identifier for some item of data, and the value refers to either the data that is identified or a pointer to the location of that data.) Unlike the more common "transactional" databases used for routine business applications, KV-stores are designed to quickly retrieve indexed data items—they may rapidly ingest application writes while providing fast point lookups on individual key-value entries as well as supporting analytical queries of entries having variable-length ranges. Because of their size, KV-stores may utilize a hierarchy of storage options reflecting the trade-off between access speed and cost per bit of storage. Given a large dataset that receives frequent additions ("writes") and the need to index that dataset to support queries, it can be challenging to organize the tiers of available storage for optimum efficiency and performance.

Additionally, the proportion of writes in many applications today is growing significantly; at the same time, the advent of flash-based SSDs has made write I/Os much more expensive than read I/Os. As a result, KV-stores increasingly optimize the application writes using write-optimized data structures. For example, KV-stores may use a log-structured hash table (LSH-table), which is a data structure that buffers application writes in memory and then flushes them to a log in storage when the buffer is full. An LSH-table typically maintains a hash table in memory for mapping the keys to the locations of the corresponding entries in the log.

KV-stores may also use a log-structured merge-tree (LSM-tree). LSM-trees maintain data in two or more separate structures, each of which is optimized for its respective underlying storage medium; data is synchronized between the two structures efficiently, in batches. More specifically, LSM trees cascade data over time from smaller, higher-performing (but more expensive) storage facilities to larger, slower and less-expensive facilities. All incoming insertions, updates and deletions are first logged in an in-memory buffer. When the buffer fills up, its contents are sorted by key and flushed onto the disk as a sorted "run"—i.e., an array of key-value pairs. Once there, any two runs with equal size are sort-merged (in order to remove obsolete entries to reclaim space, and bound the number of runs that a lookup has to probe), and stored as a block of double length. Since the runs being merged are already sorted, the merging procedure may be performed efficiently, thereby applying updates and deletions to older data and maintaining the newest version of inserted elements. In this way, duplicates of the same key can exist throughout the tree; but because of logging updates and deletes, the duplicates may be incrementally resolved as the on-disk levels get incrementally merged to create the next larger level.

To speed up lookups on individual runs, modern designs of LSM-trees maintain two additional data structures in main memory. First, for every run there is a set of fence pointers that contain the first key of every disk page of the run; this allows lookups to access a particular key within a run with just one I/O. Second, for every run there is a Bloom filter, which probabilistically allows a run to be skipped if it does not contain the target key. (A Bloom filter is a probabilistic data structure used to test whether an element is a member of a set. False positive matches are possible, but false negatives are not—i.e., a query returns either "possibly in set" or "definitely not in set." The more elements that are added to the set, the larger the probability of false positives will be.)

The LSH-table and LSM-tree data structures have their advantages and disadvantages. For example, LSH-table offers fast writes by virtue of logging them; it also offers fast point lookups by using the hash table to find an entry in the log with one I/O. The memory footprint for the hash table, however, is high as it contains all keys. Moreover, range lookups may be impractically slow because the log is unordered and, as a result, the entire log is scanned to find all entries within a given target key range. On the other hand, LSM-tree imposes more expensive writes as it sort-merges entries across a logarithmic number of levels. In exchange, range lookups in an LSM-tree are fast as they scan only the target key range at each of the runs. Moreover, the overall memory footprint in an LSM-tree is lower as the fence pointers contain only one key for every storage block and the filters require only a few bits per entry. FIG. 1 summarizes the properties of LSH-table and LSM-tree.

Accordingly, conventional KV-stores must choose between two mutually exclusive sets of data structures: LSH-table, which has fast writes with impractical range lookups and large memory requirements, or LSM-tree, which has expensive writes with fast range lookups and modest memory requirements. With applications becoming increasingly diverse, tailored designs are required to fully optimize I/O and memory. The binary choice between LSH-table and LSM-tree, however, forces a rigid compromise one way or the other. Little is known today about how to navigate the space between LSH-table and LSM-tree and what trade-offs result in this space. In fact, it is even uncertain whether LSH-table and LSM-tree are the best possible extreme points in the space, or whether it is possible to narrow the space by devising dominating designs with better tradeoffs.

Accordingly, there is a need for a data structure in KV-stores bridging LSH-table and LSM-tree, thereby alleviating the compromised performance associated therewith.

SUMMARY

Embodiments of the present invention provide a new multi-level data structure, log-structured merge bush (LSM-bush), to alleviate the performance compromise between LSH-table and LSM-tree. Similar to LSM-tree, LSM-bush may buffer writes in memory, merge the writes as sorted runs across multiple levels in storage, and use in-memory fence pointers and Bloom filters to facilitate lookups. LSM-bush differs from LSM-tree in that it allows newer data to be merged more "lazily" than LSM-tree. This can be achieved by allowing larger numbers of runs to be collected at the smaller levels before merging them. More specifically, LSM-bush may include two kinds of levels: a "cap level," which is the largest level L and containing exactly one run having most of the data, and "staging levels" corresponding to the rest of the levels, each capable of containing multiple runs. In various embodiments, each staging level in LSM-bush has a capacity; when runs in a level reach the level's capacity, all runs within that level may be sort-merged, and the resulting run may be placed at the next level. Typically, the capacity increases with the staging level—i.e., a larger staging level has a larger capacity. As a result, a capacity ratio representing the amount by which the capacity of one staging level is larger than that of its adjacent, smaller staging level can be determined. In one embodiment, LSM-bush sets growing capacity ratios between adjacent pairs of the staging levels, while at the same time merging at smaller levels only when they fill up. In other words, the capacity ratio between two smaller staging levels is set to be larger than that between two larger staging levels. Thus, larger numbers of runs can be gathered in the smaller staging levels before merging them. In this way, LSM-bush may eliminate most merging relative to LSM-tree to achieve asymptotically faster writes competitive with LSH-table. In addition, because larger staging levels may gather fewer but larger runs, they may be progressively more read-optimized. Accordingly, LSM-bush as described herein may achieve fast and scalable range lookups competitive with LSM-tree.

In some embodiments, LSM-bush allocates its Bloom filters such that false positive rates at the smaller, more write-optimized levels are increasingly improbable (i.e., the false positive rates increase with the staging levels). This may enable fast and scalable point lookups. In addition, based on the application workload, LSM-bush may expose the number of levels as a tuning parameter so as to provide a desired trade-off among writes, range lookups, and memory. Accordingly, LSM-bush bridges the design space between LSH-table and LSM-tree, thereby opening up a new trade-off continuum among reads, writes, and memory that can be navigated tractably based on application requirements.

Embodiments of the present invention provides an improved key-value approach based on LSM-trees that advantageously strikes the optimal balance between the costs of updates and lookups with any given main memory budget. The improved approach involves allocating memory to Bloom filters differently across different tree levels so as to minimize the sum of the false positive rates (FPRs) associated with the Bloom filters. In one implementation, the FPR of each Bloom filter is set to be proportional to the number of entries in the memory access run to which the Bloom filter corresponds; this indicates that the FPRs for shallower levels in the LSM-tree exponentially decrease. Because the same amount of memory can have a higher impact in reducing the FPR for smaller runs, this approach may advantageously shave a factor of O(L) (where L is the number of LSM-tree levels) from the worst-case lookup cost as well as allow the lookup cost to scale better with the data volume (as compared with conventional key-value systems based on LSM-trees). In addition, because the improved approach may remove the dependence of the lookup cost on the buffer size of LSM-tree, the contention in how to allocate main memory between the filters and the buffer may be removed, thereby simplifying system tuning.

In various embodiments, the improved key-value approach can predict how changing a system design parameter (e.g., the size ratio among the levels, the merge policy, the FPRs assigned to the Bloom filters across different levels, and/or the allocation of main memory between the buffer and the filters) or an environmental parameter (e.g., the main memory budget, the proportion of reads and writes in the workload, the number and/or size of data entries, the underlying storage medium, etc.) would impact worst-case performance. This may be achieved by closed-form models for the worst-case I/O costs of lookups and updates in terms of the LSM tree design parameters. For example, the closed-form models may predict how a change in main memory utilization or allocation may reposition the Pareto curve in the LSM-tree design space. (As further described below, a Pareto curve plots the cost trade-off between database lookups and updates. Along the Pareto curve, the lookup cost cannot be improved without sacrificing update cost, and vice versa). Thus, the improved approach may "self-tune" the system design parameters and/or environment parameters to maximize the worst-case throughput. In various embodiments, this is achieved by, first, using asymptotic analysis to map the design space and thereby devise a rule for allocation of main memory between the buffer and the filters; and modeling worst-case throughput with respect to (1) the model for the lookup cost and update cost, (2) the proportion of lookups and updates in the workload, and (3) the costs of reads and writes to persistent storage.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 1 graphically summarizes the properties of LSH-table and LSM-tree data structures.

FIG. 2A schematically illustrates the basic architecture of the LSH-table data structure.

FIG. 2B schematically illustrates the basic architecture of the LSM-tree data structure.

FIG. 3 lists comparative complexities among various log-structured file systems.

FIG. 6 is a table summarizing the properties of LSM-bush and provides a comparison with LSH-table and LSM-tree.

FIGS. 11 and 12 are tables summarizing various metrics and parameters for various file systems.

FIGS. 14 and 15 are tables summarizing various metrics and parameters for a super-structure of a continuum in accordance with various embodiments.

DETAILED DESCRIPTION

Technical Terms and Environment

Figure 4:
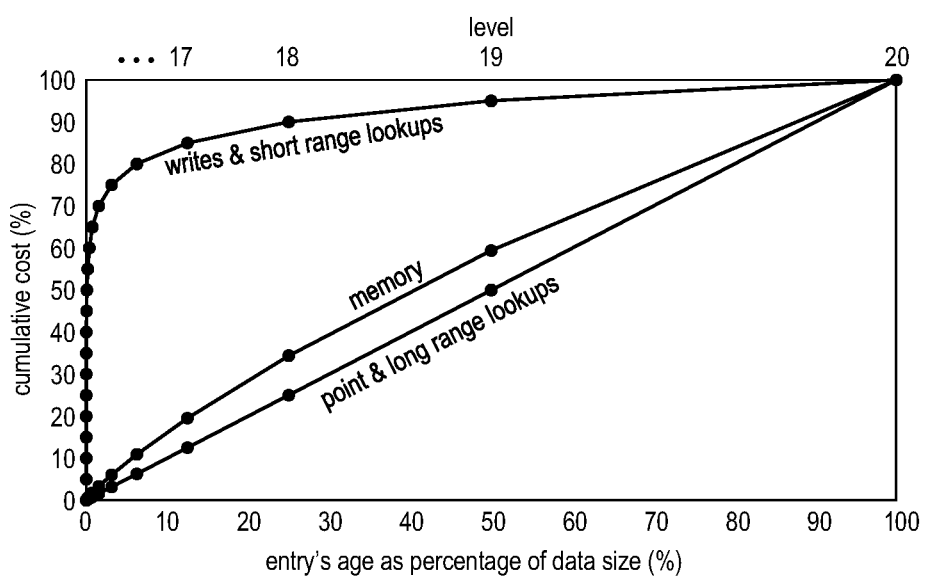
FIG. 4 graphically depicts the contributions of various levels of LSM-tree to the costs of writes, range lookups, point lookups and memory.

The following terms and abbreviations are used throughout the ensuing description:

| Term | Definition | Unit |
| --- | --- | --- |
| L | number of levels | Levels |
| $r_i$ | capacity ratio of level i | |
| B | block size | entries |
| T | Capacity ratios' growth rate | |
| N | Overall data size | Blocks |
| $N_i$ | Data size at Level i | Blocks |
| P | Buffer size | Blocks |
| $a_i$ | Number of runs at level i | runs |
| V | Overall number of runs | Runs |
| s | Range lookup size | blocks |
| $P_{sum}$ | Sum of false positive rates | |
| $P_i$ | False positive rate at Level i | |
| M | Overall memory footprint | bits |
| $M_i$ | Memory foorprint at Level i | bits |
| K | Average key size | bits |

1) LHS Table

LSH-table optimizes data ingestion by buffering all application updates in memory and appending them in large batches to a log in mass storage whenever the buffer fills up. To enable fast point lookups, LSH-table maintains a hash table in memory that maps every key to its corresponding entry in the log. LSH-table also performs garbage-collection to reclaim space occupied by obsolete entries (i.e., for which a more recent entry with the same key had been inserted). To ensure fast and consistent recovery from power failure, LSH-table periodically checkpoints the hash table and recovers the buffer using a write-ahead-log or is able to forgo the buffer's contents while remaining in a consistent state. FIG. 2A illustrates the basic architecture of LSH-table.

LSH-table processes application writes by first buffering them in memory. When the buffer fills up, LSH-table performs navigational and garbage-collection bookkeeping in memory as follows. For every "insertion" of a new entry, LSH-table inserts the key into the hash table along with a pointer to the back of the log. For every "update" to an existing entry, LSH-table updates the corresponding pointer in the hash table to point to the back of the log; in addition, it increments a "garbage-collection counter" to keep track of the number of obsolete entries in the log. For every "delete," LSH-table removes the corresponding entry from the hash table and increments the garbage-collection counter. Finally, LSH-table flushes the buffer to the back of the log in storage.

The garbage-collection counter allows LSH-table to infer the fraction of obsolete entries in the log. Once this fraction reaches a configurable threshold, th (typically set at approximately ½), LSH-table garbage-collects one or more blocks from the front of the log. It infers, for each entry of those blocks, whether the entry is obsolete; this can be achieved by checking whether its pointer in the hash table is still pointing to the block from which it is being garbage-collected. If so, the entry is still valid and may be reinserted into the buffer. Otherwise, the entry is obsolete and may be discarded as a more recent entry with the same key had to have been inserted for the pointer to point elsewhere.

The I/O cost per application write in LSH-table can be expressed as $O(1/(B \cdot th))$ since a single I/O copies B entries from the buffer to the log, and on average at least (B·th) of those entries are new application writes (while the rest are garbage-collected entries). Because th is approximately ½ in general practice, the write cost may be simplified to $O(1/B)$ amortized I/O per application write.

For a range lookup, LSH-table scans the entire log to find all valid entries within the key range at a cost of $O(N)$ I/Os, where N is the data size in blocks. When processing a point lookup, LSH-table first checks whether the target entry is in the buffer. If so, it retrieves the entry and terminates. Otherwise, it probes the hash table to identify the location of the most recent entry with the target key in the log. It then retrieves that entry with one I/O. Point lookup cost is therefore $O(1)$ I/O. In addition, since the hash table contains the keys for all entries, its memory footprint can be expressed as $\Omega(N \cdot B \cdot K)$ bits, where N·B represents the overall number of entries in the system and K represents the average size of a key in bits.

2) LSM Tree

LSM-tree sort-merges similarly sized batches of application writes into increasingly large runs in storage. Thus, it amortizes the overheads of sorting with respect to new data arrival. To enable fast point and range lookups despite having multiple runs that potentially need to be searched, modern LSM-tree designs use in-memory fence pointers to quickly find the relevant key range at each run. Moreover, in-memory Bloom filters are implemented to further speed up point lookups by skipping runs that do not contain target keys. FIG. 2B illustrates the basic architecture of LSM-tree.

LSM-tree organizes runs in storage into L levels of exponentially increasing capacities while using a fixed capacity ratio T between each pair of levels (e.g., T=2 in FIG. 2B). As a result, the number of levels L is $O(\log_T(N))$. Application updates are first buffered in memory and then flushed to level 1 in storage as a sorted run when the buffer fills up. When level i reaches capacity, all runs within that level are sort-merged and the resulting run is placed at level i+1. Since entries are updated, out-of-place, multiple versions of the same entry can accumulate over time. To reclaim space, when two entries with the same key from different runs are encountered during a merge operation, the older entry is discarded as it is less recent and therefore obsolete.

There exist different policies for merging runs in LSM-tree, each with distinct properties. A leveled merging policy triggers a merge at a level as soon as a new run comes in. This leads to every entry getting merged and rewritten on average O(T) times within each level (i.e., before the level fills up and its contents are moved to the next level). Write cost is therefore $O(T \cdot \log_T(N)/B)$ I/O. Because each level contains at most one run, there are at most $O(\log_T(N))$ runs in the system potentially needed to be probed for lookups. With write-intensive workloads, however, leveled merging may become a performance bottleneck as many merge operations take place within and across levels. Worse, these merge overheads grow logarithmically as the data size increases. To mitigate these overheads, other merging policies, such as tiered merging allowing multiple runs to accrue at each level before merging them, have been used. This reduces write cost to $O(\log_T(N)/B)$ I/O, while the number of runs in the system increases to $O(T \cdot \log_T(N))$ as every level contains at most T runs. As further described below, merge overheads using more write-optimized designs may still increase as a function of $O(\log(N)/B)$ with respect to the size of the data. In the analysis below, T is abstracted out of the cost expressions for LSM-tree in order to simplify the analysis while retaining sufficient generality to represent all conventional LSM-tree designs. To address the overhead issue, various embodiments provide a new merge policy that allows the overhead to increase more slowly or not at all in response to the size increase of the data, while still achieving fast lookups and a modest memory footprint.

A range lookup in LSM-tree typically uses fence pointers to access the relevant key range at each of the runs. This thus involves $O(\log(N))$ random I/Os to each of the runs and O(s) additional I/Os to access all entries in the key ranges, where s is the number of pages in the key range across all runs. As a result, range lookup cost is $O(\log(N)+s)$ I/O.

LSM-tree processes a point lookup by first searching the buffer and terminating when it finds the target entry. Otherwise, it traverses the levels from smallest to largest and searches the runs within each level (if there are more than one) from youngest to oldest. In addition, it uses in-memory Bloom filters to skip probing runs that do not contain the target key. For every run for which the corresponding Bloom filter returns a positive, LSM-tree uses the fence pointers to identify the target key range and accesses it with one I/O. The cost of a point lookup thus includes one I/O for retrieving the target entry and an additional number of I/Os resulting from the Bloom filters that potentially return false positives. The general cost expression is thus given by:

$$O\left(1 + \sum_{i=1}^{L} p_i\right) I/O$$

where $p_i$ is the false positive rate (FPR) at level i. The FPR for a Bloom filter may be given by $e^{-X \cdot ln(2)^2}$, where X is the number of bits (e.g., 10) per entry assigned to the filter. In one embodiment, LSM-tree assigns the same FPR to filters at all levels; thus, their point lookup cost simplifies to $O(1+e^{-X} \cdot L)$ I/O. This may be improved to $O(1+e^{-X})$ I/O by assigning slightly less memory to filters at the largest level and using it to linearly set more bits per entry to smaller levels and thus exponentially reduce their FPRs. As long as the overall number of bits per entry across all filters is greater than ≈1.62, the term $O(e^{-X})$ is less than 1; thus the cost can be simplified to O(1) I/O.

Because runs in LSM-tree are sorted, LSM-tree may achieve a modest memory footprint. In addition, because the fence pointers need to hold only the minor max key from each block (as opposed to storing all keys in memory as with LSH-table), the footprint of the fence pointers is $\Omega(N \cdot K)$ bits, where N represents the number of storage blocks occupied by data and K represents the average key size in bits. For the Bloom filters, the memory footprint is $\Omega(N \cdot B)$ bits as there are $N \cdot B$ entries in the system and the number of bits per entry is a small constant. Adding these terms, the overall memory footprint for LSM-tree is $\Omega(N \cdot (B+K))$ bits.

FIG. 2C summarizes the properties of LSH-table and LSM-tree. As shown, LSM-tree achieves fast point and range lookups and requires a modest memory footprint while exhibiting expensive writes on account of its merge operations. On the other hand, LSH-table offers fast writes and point lookups, but it exhibits a high memory footprint and slow range lookups.

Design Goals of a New Multi-Level Data Structure

Due to their different designs, LSM-tree and LSH-table offer different sets of performance and memory trade-offs that force applications relying on KV-stores to accept a compromise. To alleviate the need for this compromise, the goal in various embodiments of the present invention is to provide a new multi-level data structure that narrows the design space between LSM-tree and LSH-table, thereby reducing the performance trade-offs that characterize these data structures.

FIG. 4 depicts contributions of various levels of LSM-tree to the costs of writes, range lookups, point lookups and memory using models developed in FIG. 3. In particular, FIG. 4 depicts the cumulative cost for each metric as it emanates from smaller to larger levels. Specifically, FIG. 4 maps a level's number on the upper y-axis to the age of an entry at that level as a percentage of the data size on the lower y-axis. The vertical distance between two adjacent points i and i−1 on a given curve represents the percentage contribution of the $i^{th}$ level to the total cost of the corresponding metric.

FIG. 4 reveals that LSM-tree merges newer data exponentially more frequently than older data. For example, an entry incurs 75% of its write cost during the first 5% of its lifetime (i.e., its "travel" as it is merged from smaller to larger levels). This is because newer data traverses smaller levels first, and since these levels are exponentially smaller, they fill up and trigger merge operations exponentially more frequently relative to larger levels. In contrast, the costs of point lookups, long range lookups and memory in FIG. 4 mostly derive from the largest levels, which contain older data. For example, the largest two levels in the figure are responsible for 75% of lookup costs and for over 65% of the memory footprint. This is because, for long range lookups, larger levels tend to contain exponentially more entries within any given target key range. For point lookups, because the FPRs at larger levels are exponentially higher, accessing those larger levels is exponentially more probable. For memory, this is because the size of the fence pointers and Bloom filters is mostly proportional to the size of the corresponding level, and larger levels have exponentially larger sizes.

1) Goal 1: Merging Newer Data Lazily

The cost asymmetry in FIG. 4 thus suggests a path for reconciling the properties of LSM-tree and LSH-table. For example, most of LSM-tree's merge overheads may be eliminated to approach a write cost closer to LSH-table by merging newer data more lazily—i.e., more runs are collected at the smaller levels before being merged. In addition, as long as most of the data remains in large sorted runs at larger levels, the costs of point lookups, long range lookups and memory may stay competitive with LSM-tree. Accordingly, various embodiments utilize a new data structure (i.e., log-structured merge bush or LSM-bush) that merges newer data lazily while gradually increasing merge greediness as the data grows older so as to provide improved trade-offs between LSH-table and LSM-tree.

2) Goal 2: Bounding the Number of Runs

The design goal above, however, may come with a caveat—i.e., lazier merging for newer data may cause newer data to be spread across a greater number of runs; this may risk increasing lookup costs. In particular, because a short range lookup has to issue one I/O to every run, its cost is proportional to the overall number of runs (indeed, FIG. 4 depicts the cumulative cost as arising equally from every level as all levels in LSM-tree contain the same number of runs). Various embodiments as further described below address this risk by bounding the overall number of runs so that all lookups, including short range lookups, are fast and scalable. In addition, various embodiments provide a tuning approach to balance merge overheads and the number of runs present based on the workload.

Log-Structured Merge Bush (LSM-Bush)

Various embodiments provide a new multi-level data structure—LSM-bush, which allows newer data to be merged more lazily than older data for reducing the write cost while still achieving fast and scalable costs for lookups and memory. Thus, LSM-bush effectively occupies the space of performance and memory trade-off between LSH-table and LSM-tree. In addition, LSM-bush can be tuned to assume different scalability trade-offs, including ones that asymptotically dominate conventional designs. The data structure herein is referred to as a "bush" because its height grows at a much lower rate in response to the growth of the data size compared to a self-balancing "tree" data structure where its height grows logarithmically with the data size.

1) High-Level Design

Figure 5:
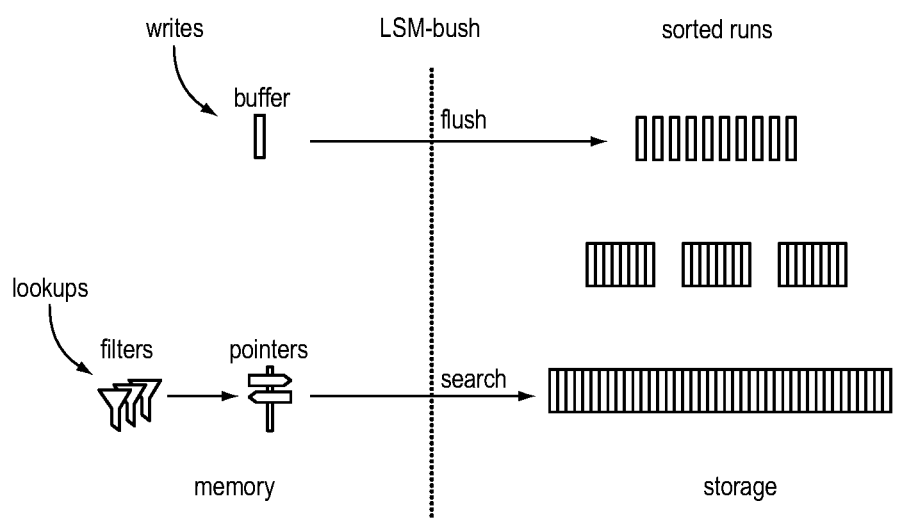
FIG. 5 schematically depicts a representative LSM-bush configuration.

FIG. 5 depicts an exemplary LSM-bush. As shown, LSM-bush adopts certain core design elements from LSM-tree, but it differs drastically from LSM-tree in ways that enable new trade-offs. For example, similarly to LSM-tree, LSM-bush includes an in-memory buffer as level 0 and multiple levels 1 to L in storage with increasing capacities. In addition, LSM-bush may include a Bloom filter and a set of fence pointers in memory to go with each run. Application writes may first go into the buffer, and when the buffer fills up, its contents are flushed as a sorted run to level 1 in storage.

Unlike LSM-tree, LSM-bush, however, includes two kinds of levels: "staging levels" corresponding to levels 1 to L−1, each capable of containing multiple runs, and a "cap level," which is the largest level L and contains exactly one run that comprises most of the data. A staging level i gathers runs until it reaches capacity, it then merges these runs and moves the merged run to a new level i+1. This is referred to herein as a "minor compaction." In contrast, the cap level immediately merges an incoming run from level L−1 with its existing run. As used herein, this is referred to as a "major compaction."

In one embodiment, LSM-bush bounds the frequency of minor compactions by setting increasing capacity ratios between adjacent pairs of staging levels so that smaller levels gather more runs before merging them. In addition, LSM-bush restricts the cost of major compactions by setting the capacity ratio between the cap level and level L−1 to be a small constant, such that only a small number of entries at the cap level need to be rewritten for every incoming entry from level L−1. At the same time, LSM-bush may enable fast range lookups by scalably restricting the overall number of runs and allowing longer ranges to be scanned sequentially at larger levels. Furthermore, LSM-bush may enable fast point lookups using a modest memory footprint by allocating the Bloom filters such that false positives at smaller levels are increasingly improbable as further described below.

2) Writes

The amortized cost of an application write may be incurred through the compactions that it instigates on its path to the cap level. To analyze this cost, two factors may be taken into account. The first factor is the number of times a new entry is rewritten before reaching the cap level. This amounts to O(L) minor compactions plus 1 major compaction. The second factor is the number of existing entries at the cap level being rewritten during a major compaction for every new entry coming from level L−1. This factor amounts to $r_L$, which is a capacity ratio between the cap level and level L−1. Two factors may then be divided by B (which is the number of entries copied in one I/O during compaction) to obtain the overall write cost per entry: $O((L+r_L)/B)$ I/O. In one implementation, LSM-bush keeps both factors L and $r_L$ small in order to guarantee inexpensive writes. This may be achieved by strategically assigning different capacity ratios between different levels.

In some embodiments, capacity ratios between different levels are assigned based on:

$$r_i = \begin{cases} T^{2^{L-i-1}}, & \text{staging level ratios} \quad (1 \le i \le L-1) \\ 2, & \text{cap level ratio} \quad (i = L) \end{cases} \quad (1)$$

where $r_i$ represents the amount by which the capacity at level i is larger than that at level i−1, and T represents a knob that controls the ratios' growth rate. In addition, to keep L small, LSM-bush may set explosively increasing capacity ratios between adjacent pairs of staging levels by setting $r_i$ to be equal to the square of $r_{i+1}$ (i.e., $r_i = r^2_{i+1}$). As a result, far more runs are gathered in smaller levels before being merged; this allows the smaller levels to be better write-optimized. In addition, because larger levels may gather fewer but larger runs before a merge is triggered, the larger levels may be progressively more read-optimized.

In some embodiments, LSM-bush fixes $r_L=2$ for the cap level. This restricts the cost of a major compaction such that at most 2 entries are rewritten at level L for each entry coming from level L−1. As a result, write cost may be simplified from $O((L+r_L)/B)$ to $O((L)/B)$ as $r_L$ is always a small fixed constant. In addition, by setting capacity ratios using eq. (1), the number of levels L (and thus write cost) remains small even for massive data sizes. As depicted in eq. (2) below, the capacity of the buffer P is smaller than the capacity at the cap level $N_L$ by a factor of the product of all size ratios. Subsequently, the number of levels L can be computed as follows:

$$N_L = P \cdot \prod_1^L r_i \qquad (2)$$
$$= P \cdot 2 \cdot \prod_1^{L-1} T^{2^{L-i-1}} \qquad \text{use Equation 1 for } r_i$$
$$= P \cdot 2 \cdot T^{2^{L-i-1}} \qquad \text{simplify}$$
$$L = 1 + \log_2(\log_T(N_L/(2 \cdot P)) + 1 \qquad \text{rearrange in terms of } L$$

Eq. (2) indicates that a higher capacity growth rate T may correspond to a decrease in the number of levels (and thus the frequency of minor compactions). As a result, writes may become cheaper yet there are more runs present in the system and potentially requiring lookups to probe. In this way, LSM-bush can assume multiple designs with different performance properties depending on the number of levels. For example, in one extreme, T is set to equal to $N_L/(2 \cdot P)$; this causes the number of levels to hit a minimum value of two. As further described below, however, there must be at least three levels to achieve fast range lookups as the data size grows. Therefore, in some embodiments, LSM-bush includes a minimum of three levels ($L_{min}$). On the other hand, the maximum number of levels ($L_{max}$) may be determined based on eq. (2), where L is maximized when T is set to 2. Eq. (3) summarizes $L_{min}$ and $L_{max}$.

$$L_{min}=3 \text{ when } T=(N_{L/(2 \cdot P)})^{1/3}$$

$$L_{max}=(1+\log_2(\log_2(N_{L/(2 \cdot P)})+1) \text{ when } T=2 \qquad (3)$$

Two special instances of LSM-bush—log-log-bush (LL-bush) and three-level-bush (3L-bush)—may then be utilized to delineate the new trade-offs provided by the LSM-bush. LL-bush is the most read-optimized instance and sets the number of levels to $L_{max}$, whereas 3L-bush is the most write-optimized instance and fixes the number of levels to $L_{min}$.

As described above, the write cost can be computed as $O(L/B)$. Thus, by plugging in $L_{min}$ and $L_{max}$ for L therein, the write cost ranges from $O(1/B)$ (with 3L-bush) to $O((\log \log N)/B)$ (with LL-bush), depending on the desired performance properties of the application. FIG. 6 summarizes the properties of LSM-bush and provides a comparison with LSH-table and LSM-tree. As shown, 3L-bush and LL-bush both achieve more scalable writes than LSM-tree, while 3L-bush asymptotically matches the write cost of LSH-table.

Accordingly, LSM-bush exposes the number of levels L as an integer tuning parameter accepting values between $L_{min}$ and $L_{max}$. In addition, based on eq. (2), the value of T corresponding to L can be computed as:

$$T = \left(\frac{N_L}{2 \cdot P}\right)^{\frac{1}{(2^{L-1}-1)}} \qquad (4)$$

The properties of LSM-bush may then be analyzed in terms of the value of L, which may vary depending on the applications. In one embodiment, the range of possible values for L is extremely small. This is because $L_{max}$ is on the order of $O(\log \log N)$, and there may be only one or two possible tunings between $L_{min}$ and $L_{max}$ even for massive data sets.

In some embodiments, LSM-bush is initialized from an empty dataset with $L_{max}$ set to 3 and T set to 2. LSM-bush accumulates and merges data across levels 1 and 2 until a merge occurs into level 3. Normal operation then commences. At this point, 3L-bush and LL-bush are structurally identical as the value of $L_{max}$ is still three (based on eq. (3)). As the data grows, however, $L_{max}$ grows and so a broader tuning range for L is enabled.

With LL-bush, L is tied to $L_{max}$. To implement this, in one implementation, eq. (3) is applied to check whether $L_{max}$ has grown after every major compaction. If so, L is increased to $L_{max}$, which then becomes the new cap level. For 3L-bush or any other fixed tuning of L, various embodiments follow every major compaction by placing the resulting run at level L, which is and remains the cap level. The value of T is then adjusted accordingly (using eq. (4)) so as to match the new data size.

3) Range Lookups

A range lookup utilizes the fence pointers to identify the start of the target key range at each of the runs, and it then proceeds to scan each of these target key ranges. The cost is $O(V+s)$ I/O, where V represents the number of I/Os used to access each of the runs, and s represents the size of the result set from across all runs. While the cost associated with s is determined by each application, the term V constitutes a fixed cost applied on every range lookup. In some embodiments, LSM-bush keeps the value of V small in order to keep the cost of range lookups low.

Because the cap level has only one run and a staging level i is larger by a factor of $r_i$ than level i−1, the maximum number of runs $a_i$ that a given level i can gather before reaching capacity can be computed as:

$$a_i = \begin{cases} r_i, & 1 \le i \le L-1 \\ 1, & i = L \end{cases} \qquad (5)$$

Using eq. (5), an upper bound on the overall number of runs V can be obtained. Eq. (6) below summarizes the number of runs across all levels. As shown, level 1 dominates this sum; this is because the number of runs at smaller levels grows at a higher than exponential rate.

$V = \Sigma_{i=1}^L a_i$ sum up the runs at all levels $\in O(a_1)$ Level 1 dominates the sum $\in O(r_1)$ use Equation 5 for $a_1$ $\in O(T^{2^{(L-2)}})$ use Equation 1 for $r_1$ $\in O((N_{L/P})^{2^L/(2^{(L+1)}-4)})$ use Equation 4 for T & simplify $\in O(N^{2^L/(2^{(L+1)}-4)})$ P is fixed & N approximates $N_L$ $\qquad (6)$ The value V derived in eq. (6) may then be plugged into the range lookup cost is O(V+s) to obtain a more detailed expression of the cost:

$$O\left(N^{\frac{2L}{2^{L+1}-4}} + s\right)$$

When L=2, the range lookup cost is O(N+s), or more simply O(N) as in this case the factor N dominates s. This thus matches the range lookup cost for LSH-table, and it is not sufficient for allowing fast range lookups. On the other hand, by plugging in $L_{min}$ for 3L-bush, the cost goes down to $O(N^{2/3}+s)$, and it converges to $O(N^{1/2}+s)$ as L is increased towards $L_{max}$ for LL-bush. Thus, with more levels, more minor compactions may take place and so there are asymptotically fewer runs to access. As further described below, these bounds allow range lookups to execute in milliseconds on an SSD, thereby enabling interactive analytics in real-time.

In sum, LSM-bush with three or more levels may dominate LSH-table in terms of range lookups. In addition, while range lookup cost is higher with LSM-bush than with LSM-tree, the term O(s) comes to dominate O(V) for larger range sizes; this thereby makes LSM-bush increasingly competitive with LSM-tree for large-scale analytical queries.

4) Point Lookups

A point lookup traverses the levels from smallest to largest, and it checks the runs within each level from youngest to oldest. The point lookup terminates when it finds the first entry with a matching key, as any matching entry at subsequent runs was created earlier and is therefore obsolete. If the key does not exist in any of the runs, the point lookup may terminate after checking all runs and finally returning a zero result to the application. To avoid having to search all O(V) runs in storage, LSM-bush in various embodiments relies on in-memory Bloom filters to skip accessing runs that do not contain the target key. While in the worst case each of the Bloom filters may technically return a false positive, thereby still leading to a cost of O(V) I/Os, in practice, the Bloom filters eliminate most of these I/Os for most point lookups. Therefore, it may be beneficial to analyze the expected worst-case point lookup cost with respect to the Bloom filters' FPRs instead. Because the cost contribution of each Bloom filter to a point lookup's I/O cost is an independent Bernoulli random variable with an expected value equal to the corresponding Bloom filter's FPR, the overall expected cost contribution of all Bloom filters is then equal to the sum of FPRs across all filters probed (as the expected sum of multiple independent random variables is equal to the sum of their individual expected values). As used herein, the sum of FPRs across all Bloom filters is denoted as $p_{sum}$.

Eq. (7) below uses $p_{sum}$ to model two distinct and important types of point lookup costs, $R_{zero}$ and R. $R_{zero}$ represents the cost of a point lookup to a key that does not exist in any of the runs. Such point lookups are common in practice, for example, to perform insert-if-not-exist operations. The expected I/O cost for such point lookups is $p_{sum}$ as they check all Bloom filters before terminating with a zero answer. In contrast, R represents the cost of a point lookup to an entry that exists at the cap level. It thus includes one I/O to retrieve the target entry from the cap level and ($p_{sum}-p_L$) to account for false positives incurred while traversing the staging levels, where $p_L$ represents the FPR at level L. In one implementation, $p_L$ is subtracted from $p_{sum}$ to avoid double counting (since accessing level L is already accounted for by having one I/O to retrieve the target entry). R thus represents the worst-case point lookup cost.

$$R_{zero}=p_{sum}$$

$$R=1+(p_{sum}-P_L) \qquad (7)$$

In order to bound both R and $R_{zero}$ to the worst-case O(1) I/O, there is a need to bound $p_{sum}$ to be a small constant using a modest and scalable memory budget. This may be achieved by carefully optimizing the Bloom filters.

The goal is thus to allocate a given memory budget of M bits across the Bloom filters so as to minimize $p_{sum}$. In one embodiment, the same FPR is assigned to the filters at all levels. For LSM-bush, this would lead to an FPR of $O(e^{-N/M})$ for each of the O(V) runs, thereby causing $p_{sum}$ to be on the order of $O(e^{-N/M} \cdot V)$ expected I/Os. An issue of using this approach is that most of the memory is allocated to larger levels as they contain most entries, while most false positives (which trigger I/Os) occur at smaller levels as they contain a greater number of runs. Another embodiment assigns slightly fewer bits per entry to the Bloom filter at the largest level and relatively more bits per entry to the filters at smaller levels. Thus, as few as one bit per entry taken from the largest level's filter may be used to increase the size of smaller levels' filters by multiple bits per entry as they contain far less data; this thereby dramatically decreases their FPRs. A critical concern, though, is not moving too much memory from the largest level to smaller levels, as this may result in diminishing returns.

Thus, various embodiments utilize a multi-variate constrained optimization approach to minimize the $p_{sum}$ function and FPRs across different levels with the constraint of the memory budget M. The multi-variate constrained optimization approach includes a first step that denotes the FPR at level i as $p_i$, and express $p_{sum}$ by summing up the products of $p_i$ and $a_i$ (i.e., the number of runs at level i) across every level as shown in eq. (8) below.

$$p_{sum}=\Sigma_{i=1}^{L}(a_i \cdot p_i) \qquad (8)$$

In the second step of the multi-variate constrained optimization approach, a closed-form expression for the number of entries at level i can be derived using eq. (9):

$$N_i = N_L / \prod_{i}^{L} r_i, \qquad 1 \le i \le L-1 \qquad (9)$$
$$= (N_L \cdot T)/(2 \cdot r_i)$$

In the third step, the memory footprint $M_i$ for level i is modeled in terms of eq. (9) using the standard memory equation for a Bloom filter in eq. (10):

$$M_i = \sum_{1}^{a_i} -(B \cdot N_i \cdot \ln(p_i))/(\ln(2)^2 \cdot a_i) \qquad (10)$$
$$= -(B \cdot N_i \cdot \ln(p_i))/\ln(2)^2$$

In a fourth step, the memory footprint $M_i$ in eq. (10) is summed up across all levels to express the overall memory footprint M in eq. (11).

$$M=\Sigma_{i=1}^{L} M_i \qquad (11)$$

Finally, Lagrange Multipliers are employed to optimize the FPRs in eq. (8) with respect to the constraint in eq. (11). Eq. (12) below represents the result of setting the FPRs for the staging levels relative to the FPR at the cap level in order to minimize $p_{sum}$.

$$p_i = \frac{T \cdot p_L}{2 \cdot r_i^2}, \text{ for } 1 \leq i \leq L-1 \text{ and } p_L < 1 \quad (12)$$

Next, an upper bound of $p_L$ that ensures $p_{sum}$ to be a small fixed constant for any tuning of LSM-bush can be derived.

$1 \geq p_{sum}$ condition for $O(1)$ point lookup cost $\geq \Sigma_{i=1}^{L}(a_i \cdot p_i)$ apply Equation 8 for $p_{sum}$ $\geq p_L + \Sigma_{i=1}^{L-1}(a_i \cdot p_i)$ take $p_L$ out of the sums $\geq p_L \cdot (1 + T/2 \cdot (\Sigma_{i=1}^{L-1} r_i^{-1}))$ apply Equations 5 and 12 for $p_i$ and $a_i$ $p_L \leq (1 + T/2 \cdot (\Sigma_{i=1}^{L-1} r_i^{-1}))^{-1}$ rearrange in terms of $P_L$ $\leq \frac{1}{2}$ upper bound the right-hand size  (13)

Eq. (13) reveals that as long as $p_L$ is set to ½ or lower and that other FPRs are set in accordance with eq. (12) with respect to $p_L$, then $p_{sum}$ may always be a small constant set to one or lower. This thus ensures that both R and $R_{zero}$ in eq. (7) are $O(1)$. Accordingly, LSM-bush matches LSM-tree and LSM-tree in terms of point lookup costs.

5) Memory

In some embodiments, the memory requirement is derived in eq. (14) below in order to ensure that $p_L$ is set to at most ½, while all other FPRs are set according to the optimization in eq. (12).

$M = \Sigma_{i=1}^{L} M_i$ start with Equation 11

$\approx M_L + M_{L-1}$ $M_L$ and $M_{L-1}$ dominate the sum $\approx -B/_{ln(2)}^2 \cdot (N_L \cdot \ln(p_L) + N_{L-1} \cdot \ln(p_{L-1}))$ use Equation 10 for $M_L$ and $M_{L-1}$ $\approx -(N_L \cdot B)/_{ln(2)}^2 \cdot (\ln(p_L) + \frac{1}{2} \cdot \ln(p_{L-1}))$ use Equation 9 for $N_{L-1}$ $\approx -(N_L \cdot B)/_{ln(2)}^2 \cdot (\ln(p_L) + \frac{1}{2} \cdot \ln(p_{L/(2 \cdot T)}))$ use Equation 12 for $p_{L-1}$ $\approx (N_L \cdot B)/_{ln(2)}^2 \cdot (\ln(2) + \ln(T))$ $p_L$ is at most 0.5

$\approx (N_L \cdot B)/_{ln(2)}^2 \cdot (\ln(2) + \ln(N_L/(P \cdot 2))/(2^{L-1}-1))$ use Equation 4 for T $M \in \Omega((N_L \cdot B) \cdot \ln(N_L/P)/2^L)$ omit small constants $\in \Omega((B \cdot N \cdot \log(N))/2^L)$ P is fixed & N approximates $N_L$  (14)

In addition, because the fence pointers include one key from every page of every run in memory, their memory requirement is $\Omega(N \cdot K)$, where N represents the number of blocks across all runs and K represents the average key size in bits. Thus, by adding the memory needed for the Bloom filters and the fence pointers, the overall memory requirement may be computed as $\Omega(N \cdot ((B \cdot \log N)/2^L + K))$. This expression indicates that when L is fixed (as with 3L-bush), the memory requirement increases super-linearly with respect to the data size at a rate of $\Omega(N \cdot ((B \cdot \log N) + K))$. On the other hand, L increase as the data grows (as with LL-bush), the bound is simplified to $\Omega(N \cdot (B+K))$. This is because by increasing L as the data grows, more merging occurs; there are then fewer runs and, as a result, less memory is needed to filter them.

In sum, LL-bush in various embodiments dominates LSH-table and matches LSM-tree in terms of memory requirement. In addition, although the memory requirement for 3L-bush technically grows faster than for the other designs, the increasing rate in 3L-bush is extremely slow in practice due to constant factors that are omitted in asymptotic analysis (as shown below). Overall, the memory requirements for all instances of LSM-bush is within the same order of magnitude as for LSM-tree while being an order of magnitude lower than for LSH-table.

6) New and Dominating Trade-Offs

Referring again to FIG. 6, all instances of LSM-bush may offer the same point lookup cost and a superior write cost to LSM-tree. Thus, LSM-bush dominates LSM-tree for typical KV-store workloads having point lookups and writes, while still achieving a competitive memory footprint and real-time analytics via range lookups. In addition, all instances of LSM-bush dominate LSH-table in terms of memory and range lookups. Thus, LSM-bush described herein may be better-suited for larger data sizes as well as for workloads that involve analytical queries.

Figure 7:
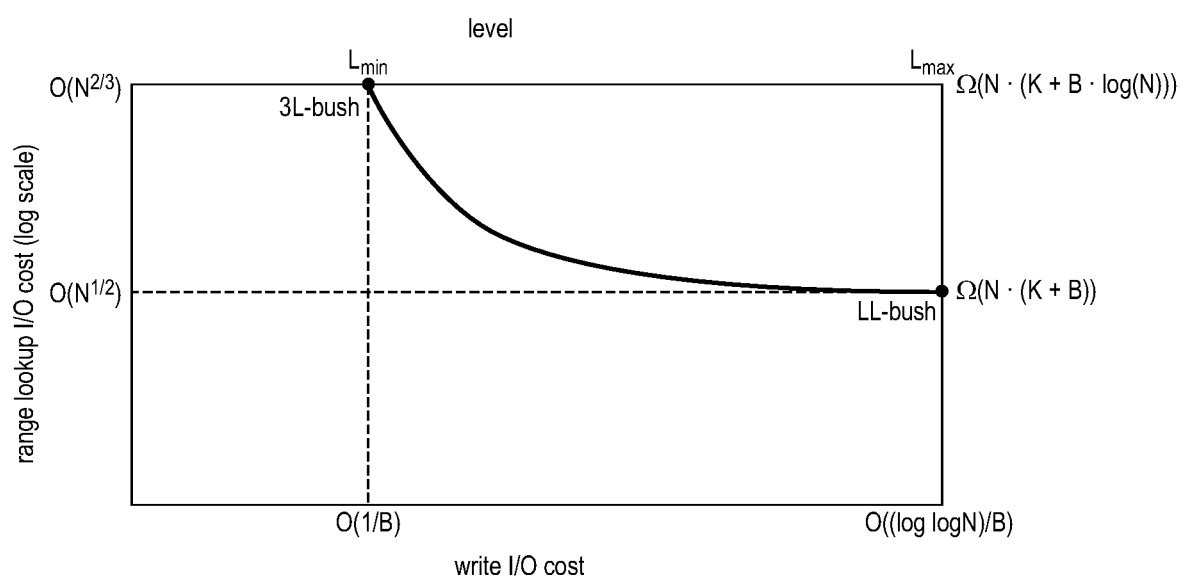
FIG. 7 graphically depicts the trade-offs of LSM-bush as a continuum that can be navigated by tuning L to achieve any read/write/memory balance along the curve that fits the workload and available memory resources best.

FIG. 7 depicts the new trade-offs of LSM-bush as a continuum that can be navigated by tuning L to achieve any read/write/memory balance along the curve that fits the workload and available memory resources best. The range of possible tunings for L is $L_{max} - L_{min}$, where $L_{min}$ is 3 and $L_{max}$ is $O(\log \log N)$. Since the function $O(\log \log N)$ grows extremely slowly, there are in practice only $L_{max} - L_{min} \approx 3$ or 4 possible tunings for LSM-bush even for a data size as large as exobytes. This makes LSM-bush tractable to tune in practice. For example, this can be done as simply as by initializing L to $L_{max}$ and decreasing it in steps for as long as writes remain the performance bottleneck or until reaching $L_{min}$. This process may take place during runtime based on performance measurements, or alternatively, it may be performed analytically in seconds.

Evaluation

To experimentally demonstrate that LSM-bush may achieve new and dominating trade-offs compared to conventional key-value store systems, LSM-bush was implemented on top of RocksDB (which is a popular and extensible open-source KV-store). At its core, RocksDB is a leveled LSM-tree, though it also supports an API that enables a client application to monitor the contents of different levels as well as to select and merge runs using customizable user-programmed logic. This API was used to block the RocksDB default merge policy, and the LSM-bush merge policy was instead implemented to gathers more runs at smaller levels while using eq. (1) to set the different levels' capacities. In addition, RocksDB by default maintains an in-memory Bloom filter for every run, and it sets the same false positive rate to runs at all levels. In one implementation, RocksDB was extended using eq. (12) to set lower false positive rates to runs at smaller levels.

1) LSM-Bush Baseline

As LSM-bush introduces a new trade-offs continuum, its two instances that delineate this continuum—i.e., the write-optimized 3L-bush and the more read-optimized LL-bush were tested. Across the results, the area between the curves for these instances reflects trade-offs that LSM-bush can strike with different tunings. An overall budget of 10 bits per entry was used for their Bloom filters.

2) LSM-Tree and LSH-Table Baselines

For LSM-tree, three different designs, RocksDB, Cassandra and Dostoevsky, were used as baselines. The RocksDB baseline uses leveled merging, a fixed capacity ratio of 10 between any pair of levels, and a uniform FPR applied to Bloom filters at all levels. The Cassandra baseline uses tiered merging, a capacity ratio of 4, and also a uniform FPR across all levels. These two baselines represent the state-of-the-art LSM-tree design, the former being more read-optimized and the latter more write-optimized. The Dostoevsky baseline, implemented on top of RocksDB, is the most similar LSM-tree variant to LSM-bush as it uses leveled merging at the largest level and tiered merging at smaller levels, and it sets optimally decreasing FPRs across smaller levels. It fundamentally differs from LSM-bush, however, in that the capacity ratios between every pair of levels is fixed to the same constant (i.e., 10 by default). In addition, ten bits per entry were assigned across the LSM-tree baselines' Bloom filters. For LSH-table, the recent KV-store, FASTER, was utilized. It is tuned to perform garbage-collection as soon as 50% of logged entries are obsolete; in addition, the same cache size as the LSM-tree baselines was assigned to FASTER in order to provide the comparison therebetween.

3) Metrics

For each system, the memory footprint, latency and throughput for application writes, point lookups and range lookups across different data sizes and workloads were measured. Since the cost of an application writes is incurred indirectly after the buffer flushes, the write cost was measured by running multiple writes across long time windows and dividing the length of the window by the number of writes the system was able to process. In addition, the time windows are ensured to be long enough in each experiment so as to account for the full amortized write cost (e.g., by waiting for at least one major compaction to take place with LSM-bush).

4) Experimental Setup

Figures 8A, 8B, 8C:
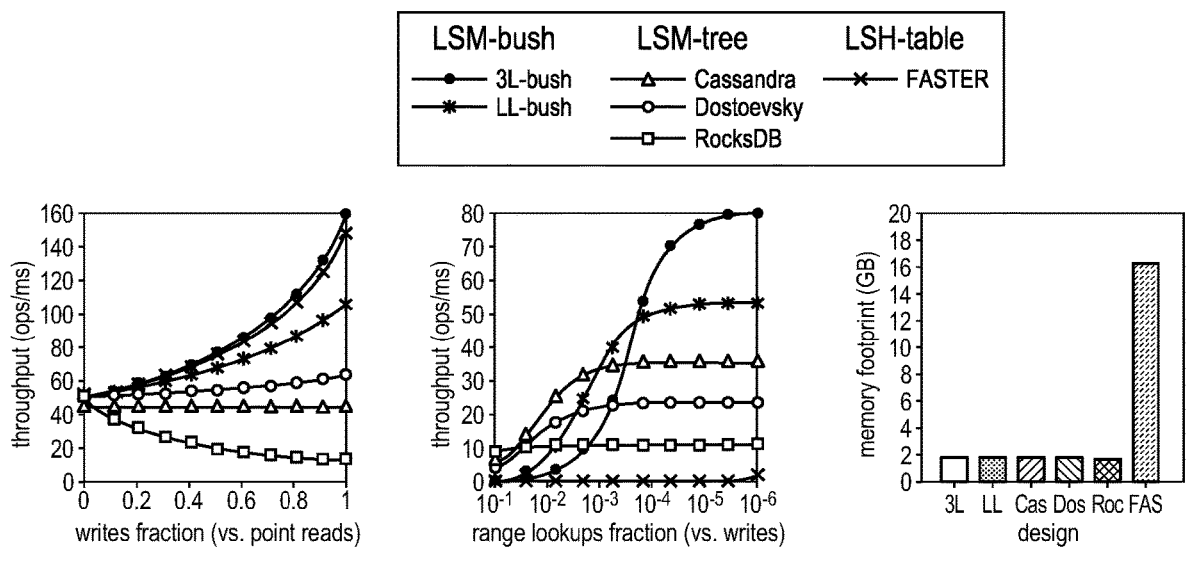
FIGS. 8A-8C depict evaluations of the different baselines using different workloads from the YCSB benchmark.

Experimental workloads were generated using and extending the YCSB benchmark. By default, each experiment commenced from a fresh clone of a 128 GB dataset having 128 byte entries of which the key includes 16 bytes. Both skewed and uniform workloads were used. Every point in FIGS. 8A-8C is an average of three experimental trials.

5) Experimental Infrastructure

The experimental infrastructure includes a machine having a one TB SSD connected through a PCI express bus, 32 GB DDR4 main memory, four 2.7 GHz cores with 8 MB L3 caches, running 64-bit Ubuntu 16.04 LTS on an ext4 partition.

6) Dominating with Zipfian Writes and Point Lookups

FIG. 8A depicts evaluation of the different baselines using workloads A, B and C from the YCSB benchmark. These workloads used a Zipfian distribution for writes and point lookups while having different ratios between the operation types (i.e., 50%, 95% and 100% of the operations being point lookups, respectively, while the rest are writes). These workloads were generalized by varying the proportion between point lookups and writes, starting with 100% point lookups and increasing the proportion of writes at increments of 10%. As shown, with only point lookups (i.e., point 0 on the x-axis), LSM-tree and both LSM-bush variants perform similarly to LSH-table as their Bloom filters enable skipping most runs and to thereby retrieve the target key with approximately one I/O. As the proportion of writes increases (from left to right on the x-axis), the LSM-bush variants come to dominate LSM-tree as they perform less merging. In fact, LSM-tree performs particularly poorly with a Zipfian write distribution because it merges frequently updated entries multiple times across its smaller levels. In contrast, LSM-bush merges newer data more lazily; this provides a buffer time for frequently updated entries to become obsolete and get discarded during the first or second merge operations that they participate in. In addition, while LSH-table does not merge entries at all, it pays a toll for garbage-collecting the log. This allows 3L-bush (the most write-optimized variation of LSM-bush) to outperform LSH-table in write-heavy workloads; 3L-bush only needs to perform one or two merge operations per entry with a Zipfian writes distribution.

7) Dominating for Writes with Occasional Analytics

FIG. 8B depicts evaluations using workload E from YCSB. This workload used a mix of 5% writes and 95% range lookups, both using a Zipfian distribution. In addition, this workload was generalized by varying the proportion between writes and range lookups starting with mostly range lookups and increasing the proportion of updates on the (log-scale) x-axis. As shown, LSM-bush and LSM-tree are both able to process range lookups in the order of milliseconds. For range-heavy workloads, LSM-tree achieves a higher throughput as each range lookup involves accessing fewer runs. As the proportion of writes increases, however, the LSM-bush baselines come to dominate the LSM-tree baselines because they require fewer merges despite being able to process range lookups scalably by upper bounding the overall number of runs. FIG. 8B further illustrates that any number of range lookups, no matter how small, cripples the performance of LSH-table as each of them requires scanning the entire log in storage. Overall, FIG. 8B illustrates that LSM-bush performs best for workloads involving very rapid data ingestion with an occasional need to perform analytics over incoming data. Further, LL-bush is shown to outperforms 3L-bush with more range lookups, while 3L-bush outperforms LL-bush as the fraction of writes increases. This demonstrates the ability of LSM-bush to optimize for different application requirements.

8) Modest Memory Footprint

FIG. 8C, the memory footprint across all baselines over the previous two experiments were measured. As shown, FASTER uses an order of magnitude more memory as its hash table takes up approximately 16 GB. In contrast, the other systems each take up approximately 1.5 GB for their Bloom filters and 0.25 GB for their fence pointers.

9) YCSB Summary

Overall, the experiments on YCSB show that (1) LSM-bush significantly outperforms LSM-tree across write-heavy workloads, (2) LSM-bush dominates LSH-table for any workload with an occasional analytical query, and (3) LSM-bush takes up a modest memory footprint that is one order of magnitude lower than with LSH-table.

The experiments described below focus on latency (rather than throughput as in the previous experiments) to map individual operations' costs to the corresponding analytical costs depicted in FIG. 6. This means that lower is better across all remaining figures.

10) Extremely Scalable Writes

Figures 9A, 9B, 9C, 9D:
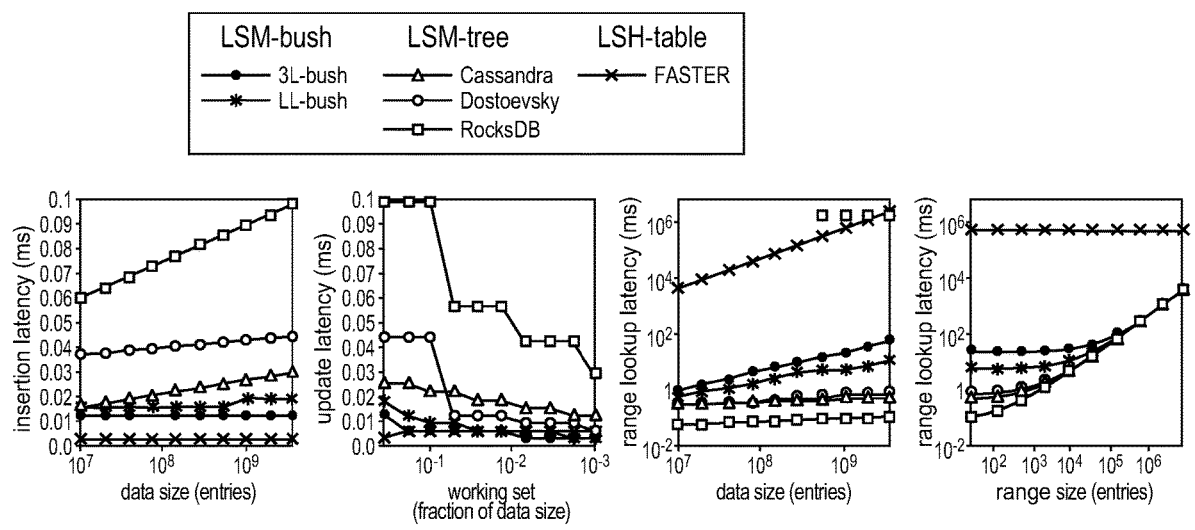
FIGS. 9A-9D and 10A-10C graphically compare LSH-table, LSM-bush, and LSM-tree across various metrics.

FIG. 9A depicts write cost scaling across all systems when the data size increases from 1 to 512 GB. The workload includes insertions of new data entries. Thus, every new entry eventually gets merged across all levels rather than getting discarded early due to an update. This workload therefore maximizes merge overheads for LSM-bush and LSM-tree so as to measure how worst-case performance scales. On the other hand, this workload represents the best-case scenario for LSH-table, as no entries become obsolete and so garbage-collection does not kick in. As shown, both LSM-bush variations exhibit cheaper and more scalable writes than with the LSM-tree baselines. In addition, although FASTER exhibits the fastest writes, i.e., by logging them, the price is an order of magnitude more memory and slow analytics (as previously illustrated on YCSB). Further, 3L-bush matches the scalability of LSH-table as it merges each entry 4-5 times on average for any data size, and in exchange, it is able to achieve an order of magnitude lower memory footprint and asymptotically faster range lookups.

11) Dominating for Skewed Updates

FIG. 9B depicts measurements of write cost with respect to skew. The experiment included uniformly randomly distributed updates with varying working set, i.e., the proportion of the data set that these updates target on the (log-scale) x-axis. As the working set size decreases from left to right on the x-axis, write cost decreases for both the LSM-tree and LSM-bush baselines. This is because the entries get merged across fewer levels before a newer version replaces them; merge operations thus recurse to fewer levels. In addition, when the working set is down to 1% of the data size or lower, LSM-bush dominates all other systems including LSH-table. This is because in this case merge operations for LSM-bush never recurse beyond level 1; whereas LSH-table pays a toll for garbage-collection. LSH-table is therefore the best design for workloads consisting of moderate to heavily skewed updates.

12) Scalable Analytics

FIG. 9C shows scaling of latency for small range lookups (e.g., to 32 entries) when the data size increases from 1 to 512 GB. As depicted, the LSM-bush variants dominate LSH-table by 4-5 orders of magnitude and increasing as the data grows. While the LSM-tree baselines exhibit the lowest latency as they have the fewest runs, the LSM-bush variants are highly competitive achieving scalable latencies in the order of milliseconds. This demonstrates that for analytics, LSM-tree performs an excessive amount of merging. Removing most of these merge overheads, as implemented in LSM-bush, still allows processing interactive, real-time analytics.

13) Increasingly Competitive for Larger Analytics

FIG. 9D illustrates measurements of range lookup latency as the target range size increases from 32 entries up to $2^{23}$ entries (i.e., up to ≈0.1% of the data size). Again, both LSM-bush variants vastly outperform LSH-table, for which the cost curve is flat as every range lookup scans the whole data. Furthermore, the LSM-bush variants become increasingly competitive with LSM-tree as the range size grows since the bottleneck shifts from having to access the runs to scanning and retrieving entries within the range at the larger levels.

14) Fast and Scalable Point Lookups

Figures 10A, 10B, 10C:
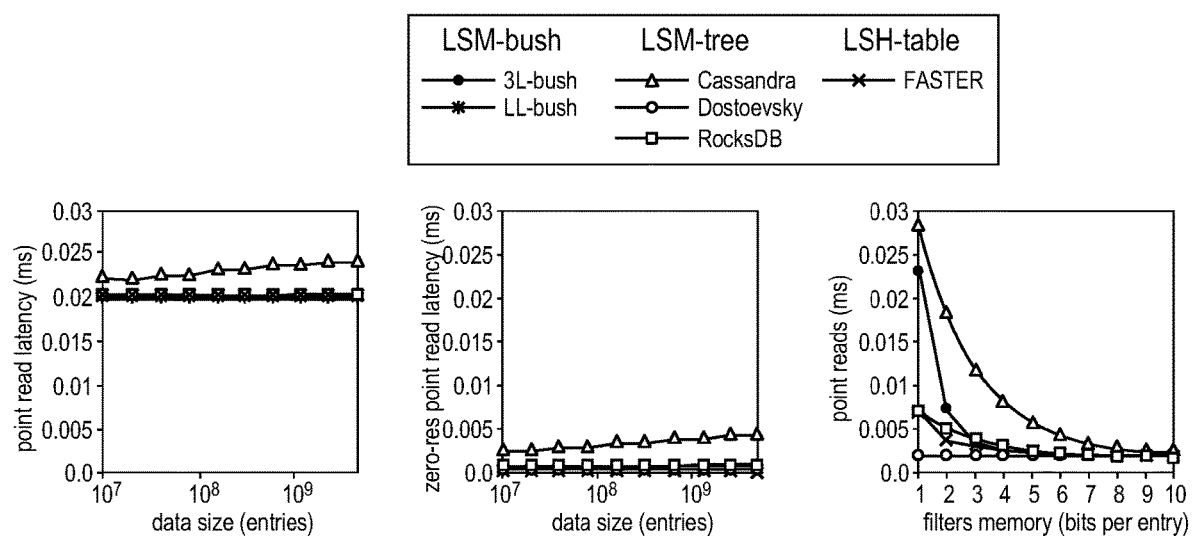

FIG. 10A relates to measurements of the latency of point lookups to existing entries in the dataset when the data size increases from 1 GB to 512 GB on the x-axis. With the exception of Cassandra (which uses relaxed tiered merging and allocates its Bloom filters sub-optimally), all systems exhibit fast and scalable performance for point lookups. This demonstrates that LSH-table wastes an excessive amount of memory for its hash table, as LSM-bush achieves the same point lookup performance using only Bloom filters and fence pointers. Additionally, FIG. 10A demonstrates that LSM-tree wastes an excessive amount of bandwidth on merging, as LSM-bush achieves the same point lookup cost using asymptotically less merging. The same experiment was repeated in FIG. 10B to demonstrate the same effect with zero-result point lookups. As show, LSM-bush overall enables fast and scalable point lookups using a fraction of the memory and/or merging, thereby enabling new and dominating trade-offs that were not possible or known before.

15) Tunable Memory Footprint

FIG. 10C relates to measurements of the point lookup latency in response to adjustments of the memory budget for the Bloom filters. LSH-table was omitted from this experiment as it does not use Bloom filters. FIG. 10C demonstrates that both LSM-bush variants provide competitive point lookup latency even with as few as 2-3 bits per entry, a small fraction of the default memory budget of 10 bits per entry used in KV-stores in industry. This is because LSM-bush assigns a relatively higher number of bits per entry to its smaller, more write-optimized levels. As these levels contain a small fraction of the overall data, even a small memory budget is able to make false positives at those levels extremely improbable. In addition, as power consumption for memory DRAM chips takes up most of the operational costs for a database server, LSM-bush can enable systems to significantly reduce runtime costs while still delivering advantageous performance for point lookups as well as writes and range lookups.

Design Continuum

Merge-bush can be viewed in the broader context of a design continuum, which unifies major distinct data-structure designs under the same model. Such unifying models 1) render what appear to be fundamentally different data structures as views of the same overall design space, and allow "seeing" new data structure designs with performance properties that are not feasible by existing designs. The core intuition behind the construction of design continuums is that all data structures arise from the very same set of fundamental design principles, i.e., a small set of data layout design concepts out of which we can synthesize any design that exists in the literature as well as new ones. As described below, a design continuum can be formulated to unify major data structure designs, i.e., B+ tree, B$^\epsilon$ tree, LSM-tree, and LSH-table.

From B+ Tree to LSM-Tree

Figure 11:
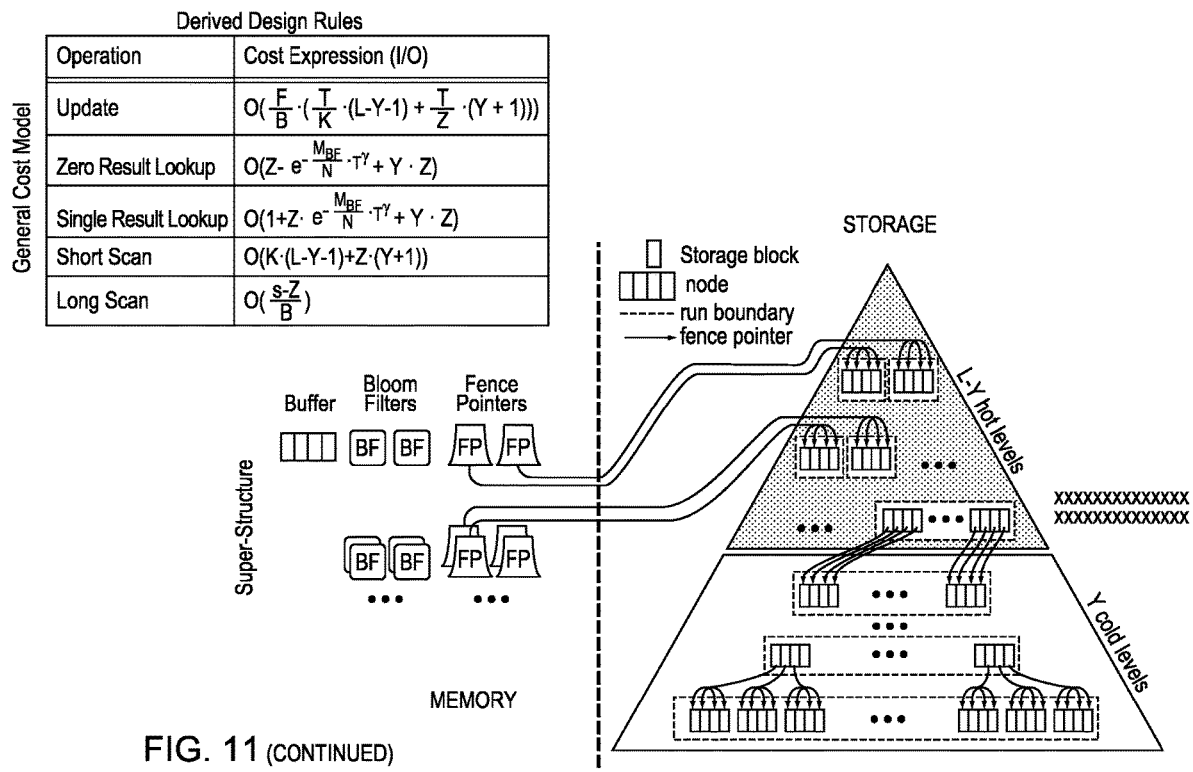

We first give an example of a design continuum that connects diverse designs including Tiered LSM-tree, Lazy Leveled LSM-tree, Leveled LSM-tree, COLA, FD-tree, B$^\epsilon$ tree, and B+ tree. The design continuum can be thought of as a super-structure that encapsulates all those designs. This super-structure has L levels where the larger Y levels are cold and the smaller L-Y levels are hot. Hot levels use in-memory fence pointers and Bloom filters to facilitate lookups, whereas cold levels apply fractional cascading to connect runs in storage. Each level contains one or more runs, and each run is divided into one or more contiguous nodes. There is a buffer in memory to ingest application updates and flush to Level 1 when it fills up. This overall abstraction allows instantiating any of the data structure designs in the continuum. FIG. 11 formalizes the continuum and the super-structure is shown at the bottom left.

Environmental Parameters. The upper right table in FIG. 11 opens with a number of environmental parameters such as dataset size, main memory budget, etc. which are inherent to the application and context for which we want to design a key-value store.

Design Parameters. The upper right table in FIG. 11 further includes five continuous design knobs which have been chosen as the smallest set of movable design abstractions that we could find to allow differentiating among the target designs in the continuum. The first knob is the growth factor T between the capacities of adjacent levels of the structure (e.g., "fanout" for B+ tree or "size ratio" for LSM tree). This knob allows us to control the super-structure's depth. The second knob is the hot merge threshold K, which is defined as the maximum number of independent sorted partitions (i.e., runs) at each of Levels 1 to L-Y-1 (i.e., all hot levels but the largest) before we trigger merging. The lower we set K, the more greedy merge operations become to enforce fewer sorted runs at each of these hot levels. Similarly, the third knob is the cold merge threshold Z and is defined as the maximum number of runs at each of Levels L-Y to L (i.e., the largest hot level and all cold levels) before we trigger merging. The node size D is the maximal size of a contiguous data region (e.g., a "node" in a B+ tree or "SSTable" in an LSM-tree) within a run. Finally, the fence and filters memory budget $M_F$ controls the amount of the overall memory that is allocated for in-memory fence pointers and Bloom filters.

Setting the domain of each parameter is a critical part of crafting a design continuum so we can reach the target designs and correct hybrid designs. FIG. 11 describes how each design parameter in the continuum may be varied. For example, we set the maximum value for the size ratio T to be the block size B. This ensures that when fractional cascading is used at the cold levels, a parent block has enough space to store pointers to all of its children. As another example, we observe that a level can have at most T-1 runs before it runs out of capacity and so based on this observation we set the maximum values of K and Z to be T-1.

Design Rules: Forming the Super-structure. The continuum contains a set of design rules, shown on the upper right part of FIG. 11. These rules enable instantiating specific designs by deterministically deriving key design aspects. Below we describe the design rules in detail.

Exponentially Increasing Level Capacities. The levels' capacities grow exponentially by a factor of T starting with the buffer's capacity. As a result, the overall number of levels L is $$\left\lceil \log_T \frac{N \cdot E}{M_B} \right\rceil,$$

where $M_B$ is the memory assigned to the buffer and N·E is the data volume.

Fence Pointers vs. Bloom Filters. Our design allocates memory for fence pointers and Bloom filters from smaller to larger levels based on the memory budget assigned by the knob $M_F$. Our strategy is to first assign this budget for fence pointers to as many levels as there is enough memory for. This is shown by the Equation for the fence pointers budget $M_{FP}$ in FIG. 11. The remaining portion of $M_F$ after fence pointers is assigned to a Bloom filters memory budget $M_{BF}$. This can also be done in the reverse way when one designs a structure, i.e., we can define the desired buffer budget first and then give the remaining from the total memory budget to filters and fence pointers.

Optimally Allocated Bloom Filters Across Levels. The continuum assigns exponentially decreasing false positive rates (FPRs) to Bloom filters at smaller levels as this approach was shown to minimize the sum of their false positive rates and thereby minimize point read cost. In FIG. 11, we express the FPR assigned to Level i as $p_i$ and give corresponding equations for how to set $p_i$ optimally with respect to the different design knobs.

Hot vs. Cold Levels. FIG. 11 further shows how to compute the number of cold levels Y for which there is no sufficient memory for fence pointers or Bloom filters (the derivation for Y is in terms of a known threshold X for when to drop a filter for a level and instead use that memory for filters at smaller levels to improve performance). We derive $M_{F_{HI}}$ as the amount of memory above which all levels are hot (i.e., Y=0). We also set a minimum memory requirement $M_{F_{LO}}$ on $M_F$ to ensure that there is always enough memory for fence pointers to point to Level 1.

Fractional Cascading for Cold Levels. To be able to connect data at cold levels to the structure despite not having enough memory to point to them using in-memory fence pointers, we instead use fractional cascading. For every block within a run at a cold level, we embed a "cascading" pointer within the next younger run along with the smallest key in the target block. This allows us to traverse cold levels with one I/O for each run by following the corresponding cascading pointers to reach the target key range.

Active vs. Static Runs. Each level consists of one active run and a number of static runs. Incoming data into a level gets merged into the active run. When the active run reaches a fraction of T/K of a levels' capacity for Levels 1 to L-Y-1 or T/Z for Levels L-Y to L, it becomes a static run and a new empty active run is initialized.

Granular Rolling Merging. When a level reaches capacity, a merge operation needs to take place to free up space. We perform a merge by first picking an eviction keys. Since each run is sorted across its constituent nodes, there is at most one node in each of the static runs at the level that intersects with the eviction key. We add these nodes into an eviction set and merge them into the active run in the next larger level.

Hence, the merge granularity is controlled by the maximum node size D, and merge operations roll across static runs and eventually empty them out.

Fractional Cascading Maintenance. As merge operations take place at cold levels, cascading fence pointers must be maintained to keep runs connected. As an active run gradually fills up, we must embed cascading fence pointers from within the active run at the next smaller level. We must also create cascading fence pointers from a new active run into the next older static run at each level. To manage this, whenever we create a new run, we also create a block index in storage to correspond to the fences for this new run. Whenever we need to embed pointers into a Run i from some new Run j as Run j is being created, we include the block index for Run i in the sort-merge operation used to create Run j to embed the cascading fence pointers within.

Unified Cost Model. A design continuum includes a cost model with a closed-form equation for each one of the core performance metrics. The bottom right part of FIG. 11 depicts these models for our example continuum. These cost models measure the worst-case number of I/Os issued for each of the operation types, the reason being that I/O is typically the performance bottleneck for key-value stores that store a larger amount of data than can fit in memory. For example, the cost for point reads is derived by adding the expected number of I/Os due to false positives across the hot levels (given by the Equation for $p_{sum}$ the sum of the FPRs) to the number of runs at the cold levels, since with fractional cascading we perform 1 I/O for each run. As another example, the cost for writes is derived by observing that an application update gets copied on average O(T/K) times at each of the hot levels (except the largest) and O(T/Z) times at the largest hot level and at each of the cold levels. We add these costs and divide by the block size B as a single write I/O copies B entries from the original runs to the resulting run.

While our models in this work are expressed in terms of asymptotic notations, such models can be captured more precisely to reliably predict worst-case performance. A central advantage of having a set of closed-form set of models is that they allow us to see how the different knobs interplay to impact performance, and they reveal the trade-offs that the different knobs control.

Overall, the choice of the design parameters and the derivation rules represent the infusion of expert design knowledge such that we can create a navigable design continuum. Specifically, fewer design parameters (for the same target designs) lead to a cleaner abstraction which in turn makes it easier to come up with algorithms that automatically find the optimal design. We minimize the number of design parameters in two ways: 1) by adding deterministic design rules which encapsulate expert knowledge about what is a good design, and 2) by collapsing more than one interconnected design decisions to a single design parameter. For example, owe used a single parameter for the memory budget of bloom filters and fence pointers as they only make sense when used together at each level.

Design Instances. FIG. 12 depicts several known instances of data structure designs as they are derived from the continuum. In particular, the top part of FIG. 12 shows the values for the design knobs that derive each specific design, and the bottom part shows how their costs can indeed be derived from the generalized cost model of the continuum. For example, a B$^+$ tree is instantiated by (1) setting the maximum node size D to be one block, (2) setting K and Z to 1 so that all nodes within a level are globally sorted, (3) setting $M_f$ to the minimum amount of memory so that Levels 1 to L get traversed using fractional cascading without the utilization of Bloom filters or in-memory fence pointers, and (4) setting the growth factor to be equal to the block size. By plugging the values of these knobs into the cost expressions, the well-known write and read costs for a B+tree of O(L) I/Os immediately follow.

As a second example, a leveled LSM-tree design is instantiated by (1) setting K and Z to 1 so that there is at most one run at each level, and (2) assigning enough memory to the knob $M_f$ to enable fence pointers and Bloom filters (with on average 10 bits per entry in the table) for all levels. We leave the knobs D and T as variables in this case as they are indeed used by modern leveled LSM-tree designs to strike different trade-offs. By plugging in the values for the design knobs into the cost models, we immediately obtain the well known costs for a leveled LSM-tree. For example, write cost simplifies to $$O\left(\frac{T \cdot L}{B}\right)$$

as every entry gets copied across O(L) levels and on average O(T) times within each level.

Figure 13:
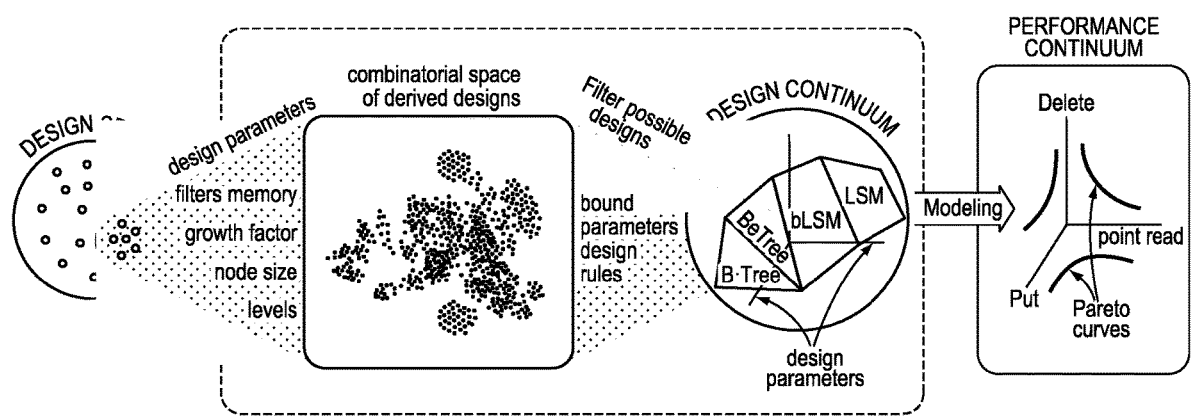
FIG. 13 is a block diagram illustrating a facility for performing an improved key-value approach in accordance with various embodiments.

Construction Summary. FIG. 13 summarizes the process of constructing a design continuum. We start by selecting a set of data structures. Then we select the minimum set of design knobs that can instantiate these designs and we impose design rules and domain restrictions to restrict the population of the continuum to only the best designs with respect to our target cost criteria. Finally, we derive the generalized cost models.

Definition of Continuum. We can now revisit the exact definition of the continuum. A design continuum connects previously distinct and seemingly fundamentally different data structure designs. The construction process does not necessarily result in continuous knobs in the mathematical sense (most of the design knobs have integer values).

However, from a design point of view a continuum opens the subspace in between previously unconnected designs; it allows us to connect those discrete designs in fine grained steps, and this is exactly what we refer to as the "design continuum". The reason that this is critical is that it allows us to 1) "see" designs that we did not know before, derived as combinations of those fine-grained design options, and 2) build techniques that smoothly transition across discrete designs by using those intermediate states.

Interactive Design

The generalized cost models enable us to navigate the continuum, i.e., interactively design a data structure for a key value store with the optimal configuration for a particular application as well as to react to changes in the environment, or workload. We formalize the navigation process by introducing Equation 1 to model the average operation cost θ through the costs of zero-result point lookups R, non-zeroresult point lookups V, short range lookups Q, long range lookups C, and updates W (the coefficients depict the proportions of each in the workload).

$$\theta = (r \cdot R + v \cdot V + q \cdot Q + c \cdot C + w \cdot W) \qquad (15)$$

To design a data structure using Equation 15, we first identify the bottleneck as the highest additive term as well as which knobs in FIG. 11 can be tweaked to alleviate it. We then tweak the knob in one direction until we reach its boundary or until θ reaches the minimum with respect to that parameter. We then repeat this process with other parameters as well as with other bottlenecks that can emerge during the process. This allows us to converge to the optimal configuration without backtracking, which allows us to adjust to a variety of application scenarios reliably. For example, consider an application with a workload consisting of point lookups and updates and an initial configuration of a lazy-leveled LSM-tree with T=10, K=T−1, Z=1, D=64, $M_B$ set to 2 MB, and $M_f$ set to N·(F/B+10), meaning we have memory for all the fence pointers and in addition 10 bits per entry for Bloom filters. We can now use the cost models to react to different scenarios.

Scenario 1: Updates Increasing. Suppose that the proportion of updates increases, as is the case for many applications. To handle this, we first increase Z until we reach the minimum value for θ or until we reach the maximum value of Z. If we reach the maximum value of Z, the next promising parameter to tweak is the size ratio T, which we can increase in order to decrease the number of levels across which entries get merged. Again, we increase T until we hit its maximum value or reach a minimum value for θ.

Scenario 2: Range Lookups. Suppose that the application changes such that short-range lookups appear in the workload. To optimize for them, we first decrease K to restrict the number of runs that lookups need to access across Levels 1 to L−1. If we reach the minimum value of K and short-range lookups remain the bottleneck, we can now increase T to decrease the overall number of levels thereby decreasing the number of runs further.

Scenario 3: Data Size Growing. Suppose that the size of the data is growing, yet most of the lookups are targeting the youngest $N_{youngest}$ entries, and we do not have the resources to continue scaling main memory in proportion to the overall data size N. In such a case, we can fix $M_f$ to $N_{youngest}·(F/B+10)$ to ensure memory is invested to provide fast lookups for the hot working set while minimizing memory overhead of less frequently requested data by maintaining cold levels with fractional cascading. Effectively the above process shows how to quickly and reliably go from a high-level workload requirement to a low level data structure design configuration at interactive times using the performance continuum.

Auto-Design. It is possible to take the navigation process one step further to create algorithms that iterate over the continuum and independently find the best configuration. The goal is to find the best values for T, K, Z, D, and the best possible division of a memory budget between $M_F$ and $M_B$. While iterating over every single configuration would be intractable as it would require traversing every permutation of the parameters, we can leverage the manner in which we constructed the continuum to significantly prune the search space. For example, when studying a design continuum that contained only a limited set of LSM-tree variants we observed that two of the knobs have a logarithmic impact on θ, particularly the size ratio T and the memory allocation between $M_b$ and $M_f$. For such knobs, it is only meaningful to examine a logarithmic number of values that are exponentially increasing, and so their multiplicative contribution to the overall search time is logarithmic in their domain. While the continuum we showed here is richer, by adding B-tree variants, this does not add significant complexity in terms of auto-design. The decision to use cascading fence pointers or in-memory fence pointers completely hinges on the allocation of memory between $M_F$ and $M_B$, while the node size D adds one multiplicative logarithmic term in the size of its domain.

Success Criteria

We now outline the ideal success criteria that should guide the construction of elegant and practically useful design continuums in a principled approach.

Functionally Intact. All possible designs that can be assumed by a continuum should be able to correctly support all operation types (e.g., writes, point reads, etc.). In other words, a design continuum should only affect the performance properties of the different operations rather than the results that they return.

Pareto-Optimal. All designs that can be expressed should be Pareto-optimal with respect to the cost metrics and workloads desired. This means that there should be no two designs such that one of them is better than the other on one or more of the performance metrics while being equal on all the others. The goal of only supporting Pareto-optimal designs is to shrink the size of the design space to the minimum essential set of knobs that allow to control and navigate across only the best possible known trade-offs, while eliminating inferior designs from the space.

Bijective. A design continuum should be a bijective (one-to-one) mapping from the domain of design knobs to the co-domain of performance and memory trade-offs. As with Pareto-Optimality, the goal with bijectivity is to shrink a design continuum to the minimal set of design knobs such that no two designs that are equivalent in terms of performance can be expressed as different knob configurations. If there are multiple designs that map onto the same trade-off, it is a sign that the model is either too large and can be collapsed onto fewer knobs, or that there are core metrics that we did not yet formalize, and that we should.

Diverse. A design continuum should enable a diverse set of performance properties. For Pareto-Optimal and bijective continuums, trade-off diversity can be measured and compared across different continuums as the product of the domains of all the design knobs, as each unique configuration leads to a different unique and Pareto-optimal trade-off.

Navigable. The time complexity required for navigating the continuum to converge onto the optimal (or even near-optimal) design should be tractable. Measuring navigability complexity allows system designers from the onset to strike a balance between the diversity vs. the navigability of a continuum.

Layered. By construction, a design continuum has to strike a trade-off between diversity and navigability. The more diverse a continuum becomes through the introduction of new knobs to assume new designs and trade-offs, the longer it takes to navigate it to optimize for different workloads. With that in mind, however, we observe that design continuums may be constructed in layers, each of which builds on top of the others. Through layered design, different applications may use the same continuum but choose the most appropriate layer to navigate and optimize performance across. Layered design enables continuum expansion with no regret: we can continue to include new designs in a continuum to enable new structures and trade-offs, all without imposing an ever-increasing navigation penalty on applications that need only some of the possible designs.

Expanding a Continuum: A Case-Study with LSH-Table

We now demonstrate how to expand the continuum with a goal of adding a particular design to include certain performance trade-offs. The goal is to highlight the design continuum construction process and principles.

Our existing continuum does not support the LSH-table data structure used in many key-value stores such as Bit-Cask, FASTER, and others. LSHtable achieves a high write throughout by logging entries in storage, and it achieves fast point reads by using a hash table in memory to map every key to the corresponding entry in the log. In particular, LSH-table supports writes in O(1/B) I/O, point reads in O(1) I/O, range reads in O(N) I/O, and it requires O(F·N) bits of main memory to store all keys in the hash table. As a result, it is suitable for write-heavy application with ample memory, and no range reads.

We outline the process of expanding our continuum in three steps: bridging, patching, and costing.

Bridging. Bridging entails identifying the least number of new movable design abstractions to introduce to a continuum to assume a new design. This process involves three options: 1) introducing new design rules, 2) expanding the domains of existing knobs, and 3) adding new design knobs.

Bridging increases the diversity of a design continuum, though it risks compromising the other success metrics. Designers of continuums should experiment with the three steps above in this particular order to minimize the chance of that happening. With respect to LSH-table, we need two new abstractions: one to allow assuming a log in storage, and one to allow assuming a hash table in memory.

To assume a log in storage, our insight is that with a tiered LSM-tree design, setting the size ratio to increase with respect to the number of runs at Level 1 (i.e., $T=(N·E)/M_B$) causes Level 1 to never run out of capacity. This effectively creates a log in storage as merge operations never take place. Our current design continuum, however, restricts the size ratio to be at most B. To support a log, we expand the domain of the size ratio with a new maximum value of $(N·E)/M_B$.

Figure 14:
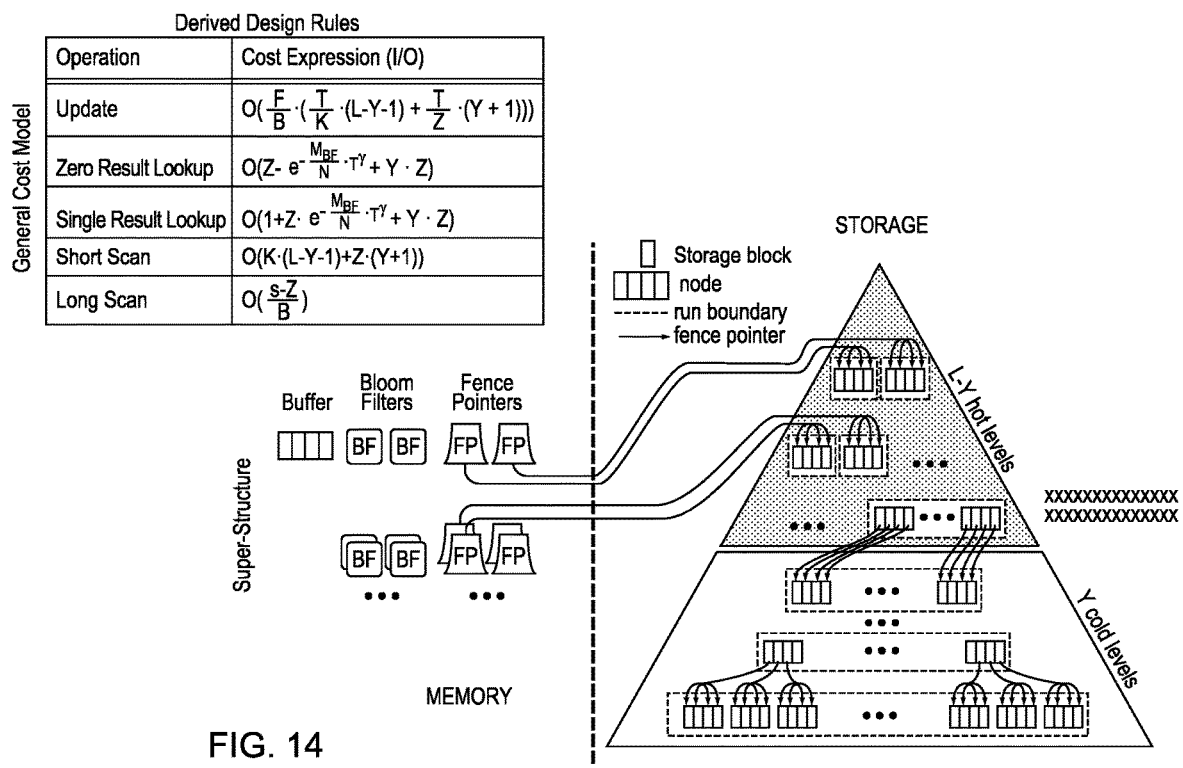

To assume a hash table in memory, recall that our continuum assigns more bits per entry for Bloom filters at smaller levels. Our insight is that when the number of bits per entry assigned to given level exceeds the average key size F, it is always beneficial to replace the Bloom filters at that level with an in-memory hash table that contains all keys at the level. The reason is that a hash table takes as much memory as the Bloom filters would, yet it is more precise as it does not allow false positives at all. We therefore introduce a new design rule whereby levels with enough memory to store all keys use a hash table while levels with insufficient memory use Bloom filters. With these two new additions to the continuum, we can now set the size ratio to $(N·E)/M_B$ and K and Z to T−1 while procuring at least F·N bits of memory to our system to assume LSH-tables. FIG. 14 shows the new super-structure of the continuum while FIG. 15 shows how LSH-table can be derived.

An important point is that we managed to bridge LSHtable with our continuum without introducing new design knobs. As a rule of thumb, introducing new knobs for bridging should be a last resort as the additional degrees of freedom increase the time complexity of navigation. Our case study here, however, demonstrates that even data structures that seem very different at the onset can be bridged by finding the right small set of movable abstractions.

Patching. Since the bridging process introduces many new intermediate designs, we follow it with a patching process to ensure that all of the new designs are functionally intact (i.e., that they can correctly support all needed types of queries). Patching involves either introducing new design rules to fix broken designs or adding constraints on the domains of some of the knobs to eliminate broken designs from the continuum. To ensure that the expanded continuum is layered (i.e., that it contains all designs from the continuum that we started out with), any new design rules or constraints introduced by patching should only affect new parts of the continuum. Let us illustrate an example of patching with the expanded continuum.

The problem that we identify arises when fractional cascading is used between two cold Levels i and i+1 while the size ratio T is set to be greater than B. In this case, there is not enough space inside each block at Level i to store all pointers to its children blocks (i.e., ones with an overlapping key range) at Level i+1. The reason is that a block contains B slots for pointers, and so a block at Level i has a greater number of children T than the number of pointer slots available. Worse, if the node size D is set to be small (in particular, when D<T/B), some of the blocks at Level i 1 will neither be pointed to from Level i nor exist within a node whereon at least one other block is pointed to from Level i. As a result, such nodes at Level i+1 would leak out of the data structure, and so the data on these blocks would be lost. To prevent leakage, we introduce a design rule that when D<T/B and B<T, the setting at which leakage can occur, we add sibling pointers to reconnect nodes that have leaked. We introduce a rule that the parent block's pointers are spatially evenly distributed across its children (every $(T/(B·D))^{th}$ node at Level i+1 is pointed to from a block at level i) to ensure that all sibling chains of nodes within Level i+1 have an equal length. As these new rules only apply to new parts of our continuum (i.e., when T>B), they do not violate layering.

Costing. The final step is to generalize the continuum's cost model to account for all new designs. This requires either extending the cost equations and/or proving that the existing equations still hold for the new designs. Let us illustrate two examples. First, we extend the cost model with respect to the patch introduced above. In particular, the lookup costs need to account for having to traverse a chain of sibling nodes at each of the cold levels when T>B. As the length of each chain is T/B blocks, we extend the cost equations for point lookups and short-range lookups with additional T/B I/Os per each of the Y cold levels. The extended cost equations are shown in FIG. 14.

In the derivation below, we start with general cost expression for point lookups in FIG. 14 and show how the expected point lookup cost for LSH-table is indeed derived correctly. In Step 2, we plug in N/B for T and Z to assume a log in storage. In Step 3, we set the number of cold levels to zero as Level 1 in our continuum by construction is always hot and in this case, there is only one level (i.e., L=1), and thus Y must be zero. In Step 4, we plug in the key size F for the number of bits per entry for the Bloom filters, since with LSH-table there is enough space to store all keys in memory. In Step 5, we reason that the key size F must comprise on average at least log(N) bits to represent all unique keys. In Step 6, we simplify and omit small constants to arrive at a cost of O(1) I/O per point lookup.

Elegance vs. Performance: To Expand or Not to Expand?

As new data structures continue to get invented and optimized, the question arises of when it is desirable to expand a design continuum to include a new design. We show through an example that the answer is not always clearcut.

In an effort to make B-trees more write-optimized for flash devices, several recent B-tree designs buffer updates in memory and later flush them to a log in storage in their arrival order. They further use an in-memory indirection table to map each logical B-tree node to the locations in the log that contain entries belonging to that given node. This design can improve on update cost relative to a regular B-tree by flushing multiple updates that target potentially different nodes with a single sequential write. The trade-off is that during reads, multiple I/Os need to be issued to the log for every logical B-tree node that gets traversed in order to fetch its contents. To bound the number of I/Os to the log, a compaction process takes place once a logical node spans over C blocks in the log, where C is a tunable parameter. Overall, this design leads to a point and range read cost of $O(C \cdot \log_B(N))$ I/Os. On the other hand, update cost consists of $O(C \cdot \log_B(N))$ read I/Os to find the target leaf node and an additional amortized $O(1/c)$ write I/Os to account for the overheads of compaction. The memory footprint for the mapping table is $O((C \cdot N \cdot F)/B)$ bits. We refer to this design as log-structured B-tree (LSB-tree). Would we benefit from including LSB-tree in our continuum?

To approach an answer to this question, we analytically compare LSB-tree against designs within our continuum to gauge the amount by which LSB-tree would allow us to achieve better trade-offs with respect to our continuum's cost metrics. We demonstrate this process in FIG. 16, which plots point and range read costs against write cost for both LSB-tree and Leveled LSM-tree, a representative part of our continuum. To model write cost for LSB-tree, we computed a weighted cost of $O(C \cdot \log_B(N))$ read I/Os to traverse the tree, $O(1/C)$ write I/Os to account for compaction overheads, and we discounted the cost of a read I/O relative to a write I/O by a factor of 20 to account for read/write cost asymmetries on flash devices. We generated the curve for LSB-tree by varying the compaction factor C from 1 to 9, and the curves for the LSM-tree by varying the size ratio T from 2 to 10. To enable an "apples-to-apples" comparison whereby both LSB-tree and the LSM-tree have the same memory budget, we assigned however much main memory LSB-tree requires for its mapping table to the LSM-tree's fence pointers and Bloom filters. Overall, the figure serves as a first approximation for the trade-offs that LSB-tree would allow us to achieve relative to our continuum.

Figure 16:
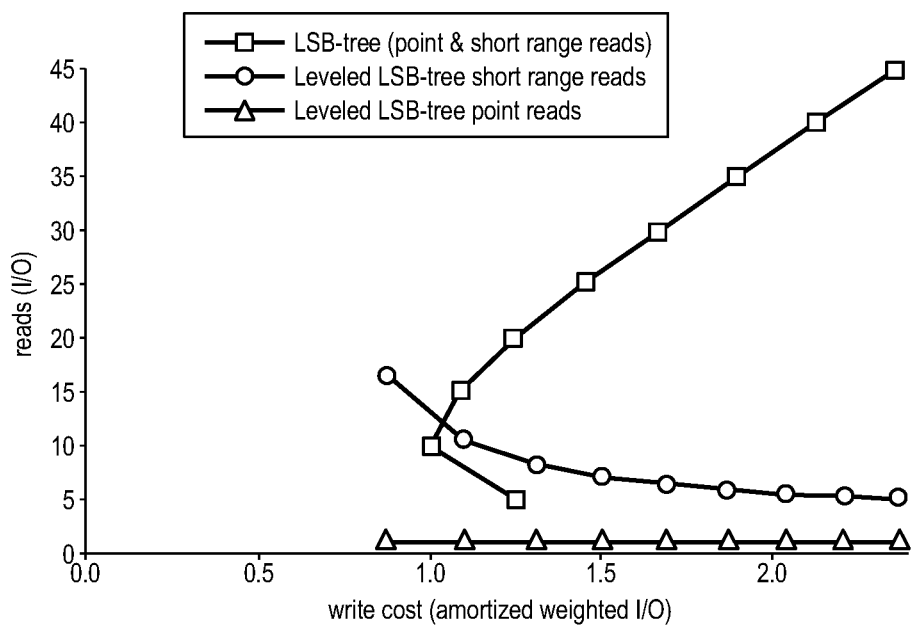
FIG. 16 graphically depicts point and range read costs against write cost in accordance with various embodiments.

FIG. 16 reveals that point read cost for the LSM-tree is much lower than for LSB-tree. The reason is that when the same amount of memory required by LSB-tree's memory budget is used for the LSM-tree's fence pointers and Bloom filters, hardly any false positives take place and so the LSM-tree can answer most point reads with just one I/O. Secondly, we observe that as we increase LSB-tree's compaction factor C, write cost initially decreases but then starts degrading rapidly. The reason is that as C grows, more reads I/Os are required by application writes to traverse the tree to identify the target leaf node for the write. On the other hand, for range reads there is a point at which LSB-tree dominates the LSM-tree as fewer blocks need to be accessed when C is small.

Elegance and Navigability versus Absolute Performance. By weighing the advantages of LSB-tree against the complexity of including it (i.e., adding movable abstractions to assume indirection and node compactions), one can decide to leave LSB-tree out of the continuum. This is because its design principles are fundamentally different than what we had included and so substantial changes would be needed that would complicate the continuum's construction and navigability. On the other hand, when we did the expansion for LSH-table, even though, it seemed initially that this was a fundamentally different design, this was not the case: LSH-table is synthesized from the same design principles we already had in the continuum, and so we could achieve the expansion in an elegant way at no extra complexity and with a net benefit of including the new performance trade-offs. At the other extreme, one may decide to include LSB-tree because the additional performance trade-offs outweigh the complexity for a given set of desired applications. The decision of whether to expand or not to expand a continuum is a continual process, for which the outcome may change over time as different cost metrics change in their level of importance given target applications.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

Representative Architecture for Log-Structured Merge Bush

The experiments described above demonstrate that LSM-bush eliminates most merging relative to LSM-tree and cuts down most of LSH-table's memory footprint, while still being able to deliver fast and scalable point lookups, as well as to process interactive small and large analytical queries. As LSM-bush improves asymptotically on LSM-tree for merging and on LSH-table for range lookups and memory, these benefits become more pronounced for larger data sizes.

As explained above, modern applications relying on write-optimized KV-stores typically face a rigid compromise by having to choose between LSM-tree vs. LSH-table based designs, each offering different performance and memory properties. Various embodiments alleviate this compromise by providing a new data structure, LSM-bush, that enables dominating trade-offs between LSM-tree and LSH-table. LSM-bush uses lazier merging for newer data so as to allow removing most of LSM-tree's merge overheads while still achieving competitive lookups and memory. In addition, LSM-bush may be tuned to open up a new reads/writes/memory trade-off continuum that can be navigated tractably based on application requirements. Further, as shown in the experiments above, LSM-bush advantageously dominates LSM-tree for write-intensive workloads and dominates LSH-table for workloads involving analytics while taking up an order of magnitude less memory. Finally, the benefits of LSM-bush increase as the data grows.

Figure 17:
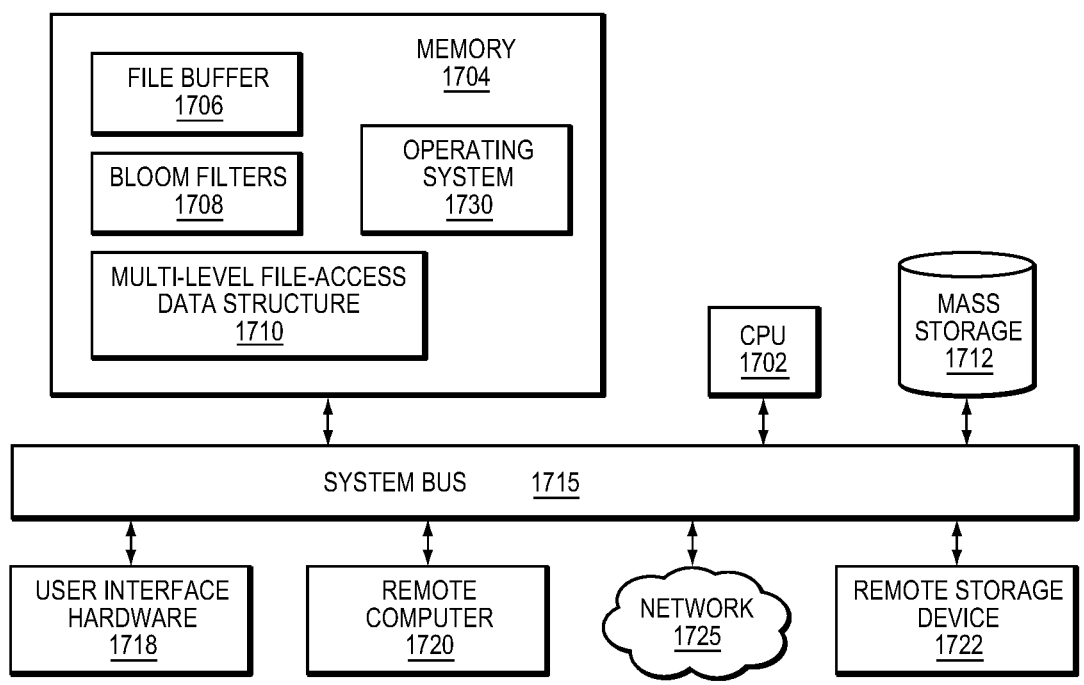
FIG. 17 schematically depicts an exemplary computer-based system in accordance with various embodiments.

LSM-bush can be implemented in any suitable combination of hardware, software, firmware, or hardwiring. FIG. 17 illustrates an exemplary system 1700 utilizing a suitably programmed general-purpose computer. The computer includes a central processing unit (CPU) 1702, at least a main (volatile) memory 1704 having a file buffer 1706, multiple Bloom filters 1708, and a multi-level file-access data structure 1710. Each Bloom filter 1708 is associated with a memory access run. The system 1700 further includes one or more non-volatile mass storage devices 1712 (such as, e.g., one or more hard disks and/or optical storage units) for storing various types of files. The CPU 1702, main memory 1704, and storage devices 1712 communicate with each other over a bidirectional system bus 1715. The bus 1715 may support internal or external input/output devices, such as traditional user interface components 1718 (including, e.g., a screen, a keyboard, and a mouse) as well as a remote computer 1720 and/or a remote storage device 1722 via one or more networks 1725. The remote computer 1720 and/or storage device 1722 may transmit any information (e.g., keys and/or values associated with various applications) to the computer system 1700 using the network 1725.

In some embodiments, the multi-level file-access data structure 1710 is part of a database management system (DBMS), which itself manages reads and writes to and from various tiers of storage, including the main memory 1704 and secondary storage devices 1712. The DBMS establishes, and can vary, operating parameters including the size ratio among levels, the merge policy, the FPR assigned to Bloom filters across different levels, and the allocation of main memory between the buffer and the filters as described above.

In addition, an operating system 1720 may direct the execution of low-level, basic system functions such as memory allocation, file management and operation of the main memory 1704 and/or mass storage devices 1712. At a higher level, one or more service applications provide the computational functionality required for implementing the improved key-value approach described herein. For example, upon receiving a query from a user via the user interface 1718 and/or from an application in the remote computer 1722 and/or the computer system 1700, the CPU 1702 may access the main memory 1704 and/or secondary storage devices 1712 via the operating system 1730 to look up the target key as described above. Upon finding the target key, the CPU 1702 may access the data that is identified by the target key; the data may be stored in a database (not shown) associated with the main memory 1704, secondary storage devices 1712, remote computer 1720 and/or remote storage device 1722. To speed up the lookup process using the improved LSM-based approach described above, in various embodiments, each of the levels of the data structure 1710 has a capacity specifying the number of runs that will be included therein before being merged and moved to a larger adjacent level, and a smaller level having a smaller capacity. The CPU 1702 determines the capacity associated with each level such that the capacity ratios corresponding to different pairs of adjacent levels in the data structure are different. As described above, at least one capacity ratio between two adjacent smaller levels may be kept larger than the capacity ratio between two adjacent larger levels such that larger numbers of runs are collected at the smaller levels before being merged.

Generally, program modules such as a DBMS include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

In addition, the CPU 1702 may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The CPU 1702 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

More generally, the computer shown in FIG. 17 is representative only and intended to provide one possible topology. It is possible to distribute the functionality illustrated in FIG. 17 among more or fewer computational entities as desired. The network 1725 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A database system comprising:
    a main memory comprising volatile storage and including a file buffer and a plurality of Bloom filters each associated with a memory access run;
    a secondary store comprising nonvolatile storage for storing files;
    memory comprising volatile storage and containing a data structure providing indexed access to files stored in the file buffer and the secondary store, the data structure being organized into a plurality of levels and indexing the files as key-value pairs; and
    a processor for writing files to and reading files from the main memory and the secondary store in runs each having a size,
    wherein (i) each of the data structure levels has a capacity specifying a number of runs included therein before being merged and moved to a level having a larger capacity, and (ii) the processor is further configured to determine the capacity associated with each level such that a first capacity ratio corresponding to the capacities of a first pair of hierarchically adjacent levels in the data structure is different from a second capacity ratio corresponding to the capacities of a second pair, different from the first pair, of hierarchically adjacent levels in the data structure.

2. The database system of claim 1, wherein at least one capacity ratio between two adjacent smaller levels is larger than the capacity ratio between two adjacent larger levels such that larger numbers of runs are collected at the smaller levels before being merged.

3. The database system of claim 2, wherein the capacity ratio satisfies an equation:

$$r_i = \begin{cases} T^{2^{L-i-1}} & 1 \leq i \leq L-1 \\ 2 & i = L \end{cases}$$

wherein $r_i$ represents the capacity ratio of the capacity in level i to the capacity in level i−1; T represents a growth rate of the capacity ratios; and L represents the largest level in the data structure.

4. The database system of claim 3, wherein the capacity ratio further satisfies an equation:

$$r_i = r_{i+1}^2.$$

5. The database system of claim 1, wherein the largest level comprises exactly one run and each of the other levels comprises one or more runs.

6. The database system of claim 1, wherein the processor is further configured to tune a total number of levels in the data structure so as to provide a desired trade-off among a write cost, a read cost and a memory footprint.

7. The database system of claim 6, wherein the processor is further configured to tune the total number of levels based at least in part on an application workload and an available memory budget.

8. The database system of claim 6, wherein the processor is further configured to tune the total number of levels within two boundary values.

9. The database system of claim 7, wherein the two boundary values satisfy an equation:

$$L_{min}=3 \text{ when } T=(N_L/2 \cdot P)^{1/3}$$

$$L_{max}=(1+\log_2(\log_2(N_L/2 \cdot P))+1) \text{ when } T=2$$

where $L_{min}$ and $L_{max}$ represent a minimal value and a maximal value of the total number of levels, respectively; $N_L$ represents a number of data entries at the largest level; P represents a size of the file buffer; and T represents a growth rate of the capacity ratios.

10. The database system of claim 1, wherein the processor is further configured to allocate the Bloom filters so as to minimize a sum of false positive rates thereacross.

11. The database system of claim 10, wherein each of the Bloom filters is associated with one of the levels, the processor being further configured to assign a false positive rate to each Bloom filter based at least in part on the capacity ratio associated with the corresponding level.

12. A method of managing electronic files, the method comprising the steps of:
    providing a main computer memory comprising volatile storage and including a file buffer and a plurality of Bloom filters each associated with a memory access run;
    providing a secondary store comprising nonvolatile storage for storing files;
    storing, in a memory comprising volatile storage, a data structure providing indexed access to files stored in the file buffer and the secondary store, the data structure being organized into a plurality of levels and indexing the files as key-value pairs; and
    writing files to and reading files from the main memory and the secondary store in runs each having a size, wherein each of the data structure levels has a capacity specifying a number of runs included therein before being merged and moved to a level having a larger capacity; and determining the capacity associated with each level such that a first capacity ratio corresponding to the capacities of a first pair of hierarchically adjacent levels in the data structure is different from a second capacity ratio corresponding to the capacities of a second pair, different from the first pair, of hierarchically adjacent levels in the data structure.

13. The method of claim 12, wherein at least one capacity ratio between two adjacent smaller levels is larger than the capacity ratio between two adjacent larger levels such that larger numbers of runs are collected at the smaller levels before being merged.

14. The method of claim 13, wherein the capacity ratio satisfies an equation:

$$r_i = \begin{cases} T^{2^{L-i-1}} & 1 \leq i \leq L-1 \\ 2 & i = L \end{cases}$$

wherein $r_i$ represents the capacity ratio of the capacity in level i to the capacity in level i−1; T represents a growth rate of the capacity ratios; and L represents the largest level in the data structure.

15. The method of claim 14, wherein the capacity ratio further satisfies an equation:

$r_i = r_{i+1}^2$.

16. The method of claim 14, wherein the largest level comprises exactly one run and each of the other levels comprises one or more runs.

17. The method of claim 14, further comprising the step of tuning a total number of levels in the data structure so as to provide a desired trade-off among a write cost, a read cost and a memory footprint.

18. The method of claim 17, further comprising the step of tuning the total number of levels based at least in part on an application workload and an available memory budget.

19. The method of claim 17, further comprising the step of tuning the total number of levels within two boundary values.

20. The method of claim 18, wherein the two boundary values satisfy an equation:

$L_{min}=3$ when $T=(N_L/2 \cdot P)^{1/3}$ $L_{max}=(1+\log_2(\log_2(N_L/2 \cdot P))+1)$ when $T=2$ where $L_{min}$ and $L_{max}$ represent a minimal value and a maximal value of the total number of levels, respectively; $N_L$ represents a number of data entries at the largest level; P represents a size of the file buffer; and T represents a growth rate of the capacity ratios.

21. The method of claim 12, further comprising the step of allocating the Bloom filters so as to minimize a sum of false positive rates thereacross.

22. The method of claim 21, wherein each of the Bloom filters is associated with one of the levels, and further comprising the step of assigning a false positive rate to each Bloom filter based at least in part on the capacity ratio associated with the corresponding level.

* * * * *